(12) United States Patent
Yasue et al.

(10) Patent No.: US 12,524,251 B2
(45) Date of Patent: Jan. 13, 2026

(54) ESTIMATING EXECUTED PATHS FROM OPERATOR EXECUTION COUNTS

(71) Applicant: International Business Machines Corporation, Armonk, NY (US)

(72) Inventors: Toshiaki Yasue, Sagamihara (JP); Kohichi Ono, Setagaya-ku (JP); Nobuhiro Hosokawa, Yokohama (JP); Hiroaki Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 18/198,420

(22) Filed: May 17, 2023

(65) Prior Publication Data

US 2024/0385855 A1 Nov. 21, 2024

(51) Int. Cl.
*G06F 9/44* (2018.01)
*G06F 9/448* (2018.01)

(52) U.S. Cl.
CPC .................. *G06F 9/448* (2018.02)

(58) Field of Classification Search
CPC ...................................... G06F 9/448
USPC ......................................... 719/320
See application file for complete search history.

(56) References Cited

U.S. PATENT DOCUMENTS

| 8,549,477 B2 | 10/2013 | Mundy et al. | |
| 8,782,638 B2* | 7/2014 | Falby | G06F 9/44505 718/1 |
| 9,792,326 B1* | 10/2017 | Lurie | G06F 16/24545 |
| 11,307,913 B2 | 4/2022 | Cho | |
| 2014/0372409 A1* | 12/2014 | Weyerhaeuser | G06F 16/2453 707/719 |

OTHER PUBLICATIONS

"5654-A23 IBM Debug Tool for z/VM 4.1", IBM United States Sales Manual, Revised: Aug. 3, 2021, 4 pages.
"HPROF: A Heap/CPU Profiling Tool", https://docs.oracle.com/javase/8/docs/technotes/samples/hprof.html, downloaded Mar. 3, 2023, 6 pages.
"IBM Application Performance Analyzer for z/OS", IBM Users Guide Version 14.2 Jan. 2022, 922 pages.

(Continued)

*Primary Examiner* — Timothy A Mudrick
(74) *Attorney, Agent, or Firm* — CHIP LAW GROUP

(57) ABSTRACT

Mechanisms are provided for identifying execution paths in computer application logic. A control flow graph is generated for the computer application logic based on source code and an execution log. Paths of the control flow graph are identified that have operators matching operators having execution counts in the execution log. An operator list for each path is generated specifying operators in the path. An operator count expression is generated for each operator in the operator list for each path. For each path, a relationship is generated between the path's operator count expression and actual execution count information for operators in the path's operator list. An execution possibility value is estimated for each path based on the relationships for each path, and a second set of paths having execution possibility values indicating they are possible execution paths of the computer application logic is output.

20 Claims, 18 Drawing Sheets

(56) References Cited

OTHER PUBLICATIONS

"Java VisualVM", https://docs.oracle.com/javase/8/docs/technotes/guides/visualvm/snapshots.html, Downloaded on Mar. 3, 2023, 4 pages.

Bala, Vasanth et al., "Dynamo: A Transparent Dynamic Optimization System", In Proceedings of the ACM SIGPLAN 2000 conference on Programming language design and implementation May 1, 2000 (pp. 1-12).

Ball, Thomas et al., "Efficient Path Profiling", Published in the Proceedings of MICRO—29, Dec. 2-4, 1996, in Paris, France, 12 pages.

Fisher, Joseph A., "Trace Scheduling: A Technique for Global Microcode Compaction", IEEE Transactions on Computers, vol. C-30, No. 7, Jul. 1981, 13 pages.

Muchnick, Steven S., "Advanced Compiler Design and Implementation", Morgan Kaufman Publishers 1997, 5 pages.

\* cited by examiner

|  | TRAN | TRANID | PGMNAME |  | EC0BJ01 | EC0BJ02 | EC0BJ03 | EC0BJ04 | POSITION | STATICS |
|---|---|---|---|---|---|---|---|---|---|---|
|  | Transaction Name | Transaction ID | Program Name | EXEC CICS READ | EXEC CICS REWRITE | EXEC CICS WRITE | EXEC CICS DELETE | EXEC CICS LINK PROGRAM | EXEC SQL |
|  | SSP1 | 63 | LGTESTP1 | 0 | 0 | 1 | 0 | 4 | 4 |
|  | SSP1 | 64 | LGTESTP1 | 0 | 0 | 1 | 0 | 4 | 4 |
|  | SSP1 | 65 | LGTESTP1 | 0 | 0 | 1 | 0 | 4 | 4 |
|  | SSP1 | 66 | LGTESTP1 | 0 | 0 | 1 | 0 | 4 | 4 |
|  | SSP1 | 67 | LGTESTP1 | 0 | 0 | 1 | 0 | 4 | 4 |
|  | SSP1 | 68 | LGTESTP1 | 0 | 0 | 0 | 0 | 3 | 1 |
|  | SSP1 | 69 | LGTESTP1 | 0 | 0 | 0 | 0 | 3 | 1 |
|  | SSP1 | 70 | LGTESTP1 | 0 | 0 | 0 | 0 | 3 | 1 |
|  | SSP1 | 71 | LGTESTP1 | 0 | 0 | 0 | 0 | 3 | 1 |
|  | SSP1 | 72 | LGTESTP1 | 0 | 0 | 0 | 0 | 3 | 1 |
|  | SSP1 | 73 | LGTESTP1 | 1 | 0 | 0 | 1 | 6 | 7 |
|  | SSP1 | 74 | LGTESTP1 | 1 | 0 | 0 | 0 | 6 | 7 |
|  | SSP1 | 75 | LGTESTP1 | 0 | 0 | 0 | 0 | 4 | 1 |
|  | SSP1 | 76 | LGTESTP1 | 0 | 0 | 0 | 0 | 5 | 1 |
|  | SSP1 | 77 | LGTESTP1 | 0 | 0 | 0 | 0 | 1 | 0 |

```
MAINLINE SECTION.
    EVALUATE WS-REQUEST-ID
      WHEN '01IEND'
         EXEC SQL SELECT ISSUEDATE, ... INTO :DB2-ISSUEDATE, ... FROM PLICY,
ENDOWMENT WHERE (...) END-EXEC
      WHEN '01IHOU'
         EXEC SQL SELECT ISSUEDATE, ... INTO :DB2-ISSUEDATE, ... FROM PLICY,
HOUSE WHERE (...) END-EXEC
      WHEN '01IMOT'
         EXEC SQL SELECT ISSUEDATE, ... INTO :DB2-ISSUEDATE, ... FROM PLICY,
MOTOR WHERE (...) END-EXEC
      WHEN '01ICOM'
         EXEC SQL SELECT RequestDate, ... INTO :DB2-LASTCHANGED, ... FROM PLICY,
COMMERCIAL WHERE (...) END-EXEC
      WHEN '02ICOM'
         EXEC SQL SELECT CustomerNumber, ... INTO :DB2-CUSTOMERNUM-INT, ... FROM
PLICY, COMMERCIAL WHERE (...) END-EXEC
      WHEN '03ICOM'
         EXEC SQL OPEN Cust_Cursor END-EXEC.
         PERFORM loop-condition-check
            EXEC SQL Fetch Cust_Cursor INTO :DB2-CUSTOMERNUM-INT,... END-EXEC
         END-PERFORM.
         EXEC SQL Close Cust_Cursor END-EXEC.
      WHEN '05ICOM'
         EXEC SQL OPEN Zip_Cursor END-EXEC.
         PERFORM loop-condition-check
            EXEC SQL Fetch Zip_Cursor INTO :DB2-CUSTOMERNUM-INT,... END-EXEC
         END-PERFORM.
         EXEC SQL Close Zip_Cursor END-EXEC.
      WHEN '01ICLM'
         EXEC SQL SELECT POLICY.CustomerNumber, ... INTO :DB2-Customernum-int, ...
FROM PLICY, CLAIM WHERE (...) END-EXEC
      WHEN '02ICLM'
         EXEC SQL OPEN CusClaim_Cursor END-EXEC.
         PERFORM loop-condition-check
            EXEC SQL Fetch CusClaim_Cursor INTO :DB2-Customernum-int,... END-EXEC
         END-PERFORM.
         EXEC SQL Close CusClaim_Cursor END-EXEC.
      WHEN OTHER
         MOVE '99' TO CA-RETURN-CODE
    END-EVALUATE.
MAINLINE-EXIT.
    EXIT.
```

*FIG. 5B*

| PROGRAM | ID | Supposed Counter Expression and Call | | | |
|---|---|---|---|---|---|
| LGTEST01 | P1 | LINK[1] | [LGIPOL01] | | |
| | P2 | LINK[1] | [LGAPOL01] | | |
| | P3 | LINK[1] | [LGDPOL01] | | |
| | P4 | LINK[1] | [LGIPOL01] | | |
| | P5 | LINK[1] | [LGIPOL01] | LINK[1] | [LGUPOL01] |
| | P6 | - | | | |
| LGIPOL01 | P7 | LINK[1] | [LGIPDB01] | | |
| LGIPDB01 | P8 | - | | | |
| | P9 | SQL[1] | | | |
| | P10 | SQL[2+N] | | | |
| LGAPOL01 | P11 | - | | | |
| | P12 | LINK[1] | [LGAPDB01] | | |
| | P13 | LINK[1] | [LGAPBR01] | LINK[1] | [LGAPDB01] |
| LGAPBR01 | P14 | - | | | |
| LGAPDB01 | P15 | - | | | |
| | P16 | LINK[1] | [LGAPVS01] | | |
| | P17 | SQL[1] | LINK[1] | [LGAPVS01] | |
| | P18 | SQL[3] | LINK[1] | [LGAPVS01] | |
| | P19 | SQL[4] | LINK[1] | [LGAPVS01] | |
| LGAPVS01 | P20 | WRITE[1] | | | |
| LGDPOL01 | P21 | - | | | |
| | P22 | LINK[1] | [LGDPDB01] | | |
| LGDPDB01 | P23 | - | | | |
| | P24 | SQL[1] | LINK[1] | [LGDPVS01] | |
| LGDPVS01 | P25 | DELETE[1] | | | |
| LGUPOL01 | P26 | - | | | |
| | P27 | LINK[1] | [LGUPDB01] | | |
| LGUPDB01 | P28 | SQL[4] | LINK[1] | [LGUPVS01] | |
| | P29 | SQL[7] | LINK[1] | [LGUPVS01] | |
| LGUPVS01 | P30 | READ[1] | REWRITE[1] | | |

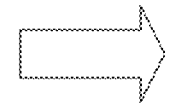
TO FIG. 8B

```
MAINLINE SECTION.
    EXEC CICS READ FILE('KSDSPOLY') ... RESP(WS-RESP) Update END-EXEC.
    IF WS-RESP NOT = DFHRESP(NORMAL)
        GO TO MAINLINE-EXIT.
    END-IF.
    EXEC CICS READ FILE('KSDSPOLY') ... RESP(WS-RESP) Update END-EXEC.
    IF WS-RESP NOT = DFHRESP(NORMAL)
        GO TO MAINLINE-EXIT.
    END-IF.
    EXEC CICS WRITE FILE('KSDSPOLY') ... END-EXEC.
MAINLINE-EXIT.
    EXIT.
```

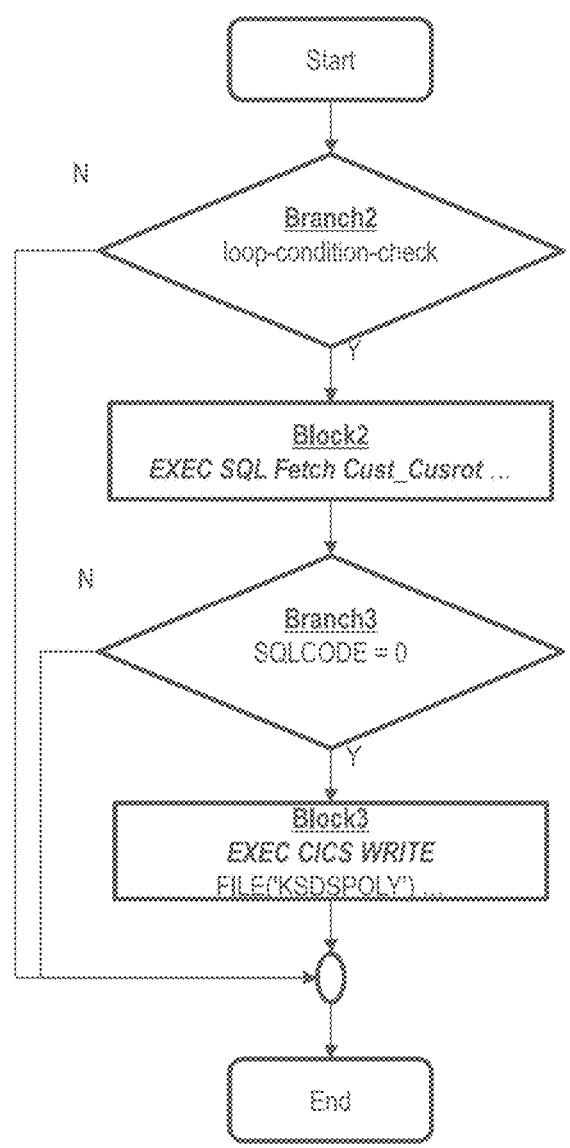
*FIG. 11A*
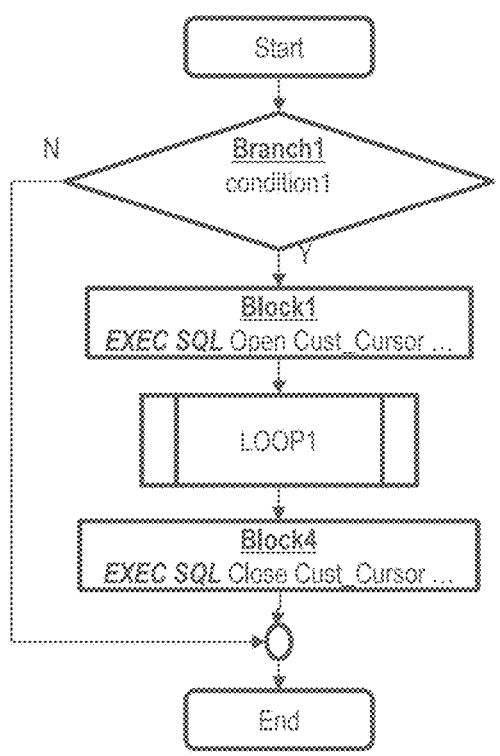
*FIG. 11C*
*FIG. 11D*

```
                          MAIN PROGRAM

MAINLINE SECTION.
        IF condition1
                GOTO MAINLINE-EXIT.
        END-IF.
        PERFORM loop-condition-check
                EXEC CICS LINK PROGRAM('WORK') ... END-EXEC.
        END-PERFORM.
        EXEC CICS LINK PROGRAM('WORK') ... END-EXEC.
MAINLINE-EXIT.
        EXIT.
```

*FIG. 12A*

```
              CALLEE PROGRAM – WORK (SAME AS FIGURE 10A)

MAINLINE SECTION.
        EXEC CICS READ FILE('KSDSPOLY') ... RESP(WS-RESP) Update END-EXEC.
        IF WS-RESP NOT = DFHRESP(NORMAL)
                GO TO MAINLINE-EXIT.
        END-IF.
        EXEC CICS READ FILE('KSDSPOLY') ... RESP(WS-RESP) Update END-EXEC.
        IF WS-RESP NOT = DFHRESP(NORMAL)
                GO TO MAINLINE-EXIT.
        END-IF.
        EXEC CICS LINK PROGRAM('WORK') ... END-EXEC.
MAINLINE-EXIT.
        EXIT.
```

*FIG. 12B*

ESTIMATING EXECUTED PATHS FROM OPERATOR EXECUTION COUNTS

BACKGROUND

The present application relates generally to an improved data processing apparatus and method and more specifically to an improved computing tool and improved computing tool operations/functionality for estimating executed paths of computer logic based on operator execution counts.

Modern computer application logic (computer program) has become very complex both in its structure and execution. For example, many modern applications utilized application programming interfaces (APIs) and/or microservices, to invoke other applications that perform some function(s) that facilitate the operation of the original application. This structure and execution can be very complex and may involve computer logic created by various providers. Moreover, modern computer application logic has greatly increased in size, making the complexity even more daunting.

It has been important, such as for debugging, resource scheduling and provisioning, and other reasons, to be able to understand how much each part of the computer program is executed when it is executed. This is often referred to as "profiling" the computer program execution. In mainframe systems, some features are provided to collect dynamic profile information for the computer programs in order to manage the mainframe system, e.g., z/OS has a standard function named System Management Facility (SMF) to monitor and collect the runtime information of system, jobs, transactions, and the like. As another example CICS performance monitoring for SMF type 110, subtype 1, class 3, collects the execution count of various "EXEC CICS" commands and "EXEC SQL" commands for each execution of a transaction as a record. For example, the fields named FCADDCT, DB2REQCT, and PCLINKCT hold the number of execution count of "EXEC CICS WRITE FILE" command, "EXEC SQL" command, and "EXEC CICS PROGRAM LINK" commands, respectively. However, this information is not collected to find execution paths and cannot be used to detect the execution paths directly using known mechanisms.

In some existing art, instrumentation of computer programs has been used to collect information about the execution of the computer program. Such instrumentation requires the insertion of extra executed code, and additional registers or storage for storing the collected information. However, with performance of computer code execution being an ever increasing concern, entities that implemented many modern computer applications do not permit such instrumentation as it degrades the performance of the computer program execution.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for identifying execution paths in computer application logic. The method comprises generating a control flow graph data structure for the computer application logic based on computer application source code and an execution log data structure corresponding to the computer application logic. The method further comprises identifying a first set of paths of the control flow graph data structure, where the first set of paths comprise paths having operators that match operators for which execution count information is present in the execution log data structure. The method also comprises generating an operator list for each path in the first set of paths specifying operators present in the path and generating an operator count expression for each operator in the operator list for each path in the first set of paths. The method also comprises generating, for each path, a relationship between an operator count expression for the path and actual execution count information for operators in the operator list for the path. In addition, the method comprises estimating an execution possibility value for each path based on the relationships for each path, and outputting a second set of paths corresponding to one or more paths whose corresponding execution possibility values indicate the one or more paths are possible execution paths of the computer application logic.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram illustrating a portion of an execution log data structure for a transaction in accordance with one illustrative embodiment;

FIG. 5B is an example of pseudocode for the program whose control flow graph is shown in FIG. 5A;

FIGS. 8A-8B are example diagrams illustrating the generation of a merged count expression list for inter-procedural paths in accordance with one illustrative embodiment;

FIGS. 11A-11D show an example of a CICS transaction program with a loop and including two CICS operations whose execution counts are collected by SMF, in accordance with one illustrative embodiment;

FIGS. 12A-12F show an example of a CICS transaction program that includes two program calls where the main program includes two CICS operators, EXEC CICS LINK PROGRAM, and the callee program, WORK, is the same program as depicted in FIGS. 10A-10B, in accordance with one illustrative embodiment;

DETAILED DESCRIPTION

Figure 1:
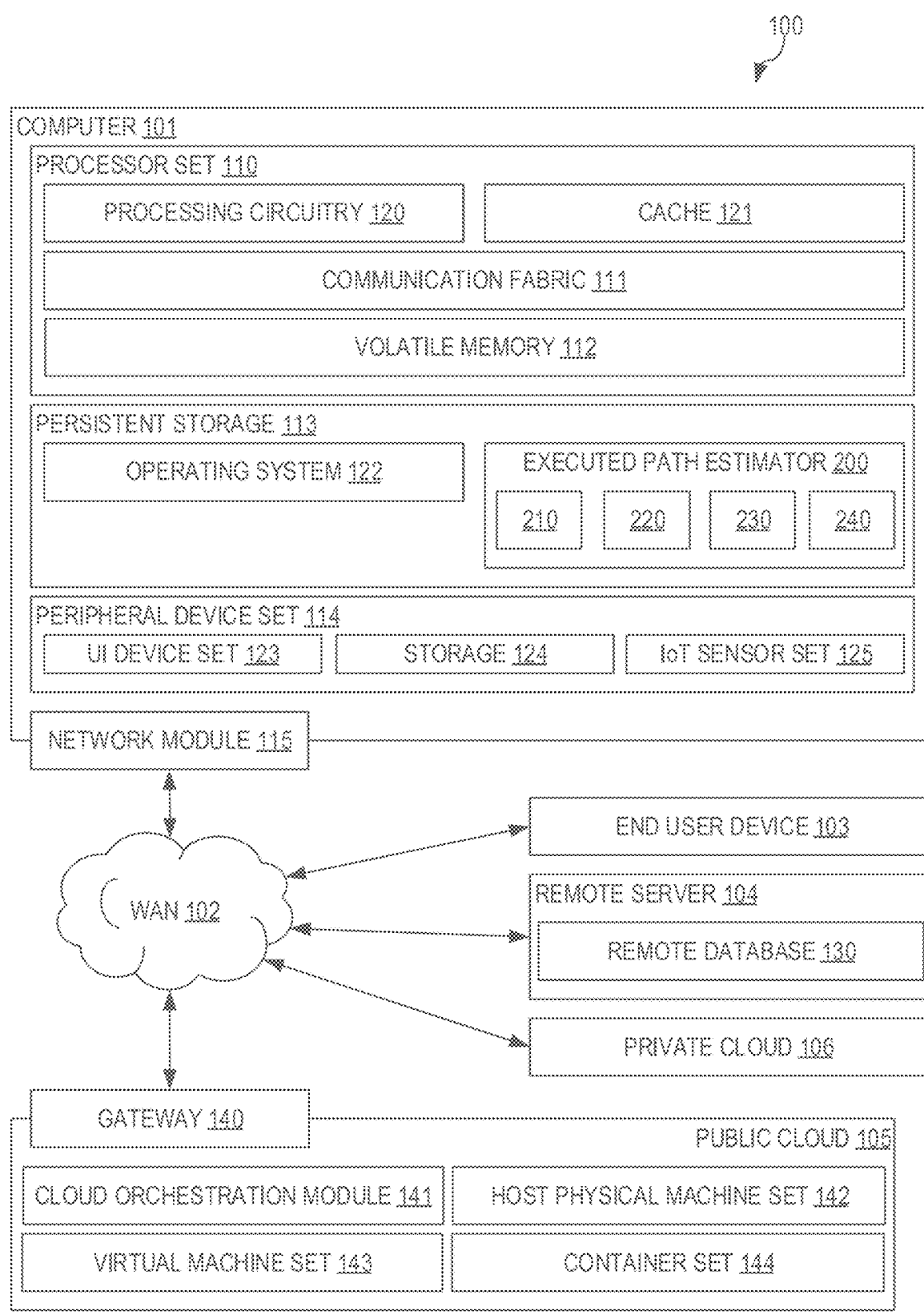
FIG. 1 is an example diagram of a distributed data processing system environment in which aspects of the illustrative embodiments may be implemented and at least some of the computer code involved in performing the inventive methods may be executed.

The illustrative embodiments provide an improved computing tool an improved computing tool functionality/operations that estimate the execution paths from the execution count of operators whose execution counts are not intended to be used to perform executed path detection. That is, the illustrative embodiments are able to estimate execution paths without having to instrument the computer application code and thereby reduce performance. The illustrative embodiments are thus, able to determine the relatively more heavily executed portions of the computer program from the identified execution counts of the elements of executed paths. This can be used for various purposes, such as debugging, resource provisioning, and the like. In some illustrative embodiments, the detection and identification of the heavily executed parts of the computer program may be used to select candidate portions of the computer program to be implemented as one or more APIs, as microservices, or the like, from the point of view of actual usage.

With the illustrative embodiments, computer application (program) source code and an execution log for that application source code are input to the executed path estimator. The executed path estimator, from the application source code, identifies the operators whose execution counts were collected in the execution log, where the operator is a statement, an expression, an operation, or a function call. The execution counts for each of these operators is also extracted from the execution log.

The executed path estimator constructs control flow graphs, i.e., graph representations of computation and control flow in the program, for each program and generates a set of execution paths from the control flow graphs. In the control flow graphs (CFGs), nodes are basic blocks and edges characterize control flow between basic blocks. The generation of such control flow graphs from application source code is generally known in the art and thus, a more detailed explanation is not provided herein. The set of execution paths extracted from the control flow graphs may each correspond to a separate branch or path through a control flow graph.

For each execution path and each operator extracted from the application source code and execution log, an expression is created by the executed path estimator. The expression represents the execution count of the operator on executed paths based on the appearance count of the operator on the path. In generating the expression, if the operator is used in a loop region of the application source code, i.e., a looping execution path which is a strongly connected component on the control graph detected using an existing technique, a variable representing the loop iteration is introduced into the expression to show the appearance count in the loop. In some cases, it is possible to bundle paths on which all the expressions are the same into an integrated path to reduce the analysis cost at later operations. If the application has multiple programs, the creation of the expressions may be applied to inter-procedural paths combined with the paths from the control flow graph (intra-procedural paths).

For each intra-procedural path (a single program in the target application) and inter-procedural path (multiple programs in the target application), and each operator in the paths, a relationship is generated that relates the expression to the execution count for that operator. Thus, for the relationship to be valid, the expression should provide the same value as the execution count for that operator. The executed path estimator detects the paths whose equations are all valid. These paths are considered to be the estimated execution paths for the execution log. If multiple paths are detected, the estimate will indicate that either path is actually executed.

Thus, the execution paths of a computer application or program may be estimated from intra-procedural and inter-procedural operator counts without having to introduce additional instrumentation into the source code. The illustrative embodiments utilize appearance counts and execution counts of operators that are not used for execution path identification, as a mechanism for estimating execution paths through the computer application or program. This provides estimated execution path identification which may then be used to perform further downstream computer analysis operations, such as selection of candidates for APIs and microservices. This helps especially in the context of computer application modernization efforts which take older computer application code and seek to modernize the computer application code for improved performance, such as by replacing portions of the older computer application code with APIs and microservices.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The illustrative embodiments provide an improved computing tool and improved computing tool functionality that automatically identifies execution paths in computer application logic, or computer programs, without introducing additional instrumentation code and instead using the execution counts of operators that are not intended to be collected for executed path detection. The improved computing tool and improved computing tool functionality estimates executed paths in computer application logic from these execution counts while maintaining the performance of the computer application logic since such instrumentation code is not required to estimate these executed paths. The identification of the executed paths may then be used as a basis for further downstream computer analysis, such as identification of portions of the computer application logic that may be implemented as APIs or microservices as part of computer application logic modernization efforts.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an executed path estimator having various engines for analyzing computer application logic or program source code and corresponding execution log data structures to estimate execution paths and provide the execution paths and their corresponding execution count information for further downstream analysis and potential modification, e.g., generating APIs or microservices for implementing the more heavily executed paths. The improved computing tool implements mechanism and functionality, such as the executed path estimator, which cannot be practically performed by human beings either outside of, or with the assistance of, a technical environment, such as a mental process or the like. The improved computing tool provides a practical application of the methodology at least in that the improved computing tool is able to solve the problems of identification of executed paths in computer application logic without affecting performance of the runtime execution of the computer application logic, specifically by estimating the executed paths from the available application source code and the execution log data structures that are already generated during runtime execution.

That is, the improved computing tool and improved computing tool functionality does not introduce any new mechanisms into the runtime execution environment of the computer application logic and uses the information gathered from the existing execution environment to estimate the executed paths in the computer application logic. As a result, performance of the runtime execution of the computer application logic is not affected, and yet the mechanisms of the illustrative embodiments are able to identify, through the executed path estimator, the execution paths actually followed during execution of the computer application logic, simply from the application source code and the execution log data structures which store the execution counts of operators, where these execution counts are not captured for identification of execution paths, and otherwise do not indicate execution paths apart from the operation of the mechanisms of the illustrative embodiments.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as executed path estimator 200 which will be described in greater detail hereafter with reference to FIG. 2. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement an executed path estimator 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identification of execution paths in computer application logic based on application source code and runtime execution log data structures, without having to introduce additional instrumentation code and without otherwise affecting the runtime execution performance of the computer application logic. The identification of the executed paths is then provided to downstream computer analysis systems for identification and potential automatic generation of APIs, microservices, debugging results, computer resource allocation and provisioning recommendations, or the like, based on the identification of the relatively more heavily executed portions of the computer application logic. This is done using automated computer processes without human intervention and using mechanisms and analysis not practically performed in the human mind. Moreover, the illustrative embodiments are specifically directed to solving a problem in the computer application arts and which arises from the computer application arts with regard to execution path identification in computer application logic, and provides a specific improvement to a specific technological field.

Figure 2:
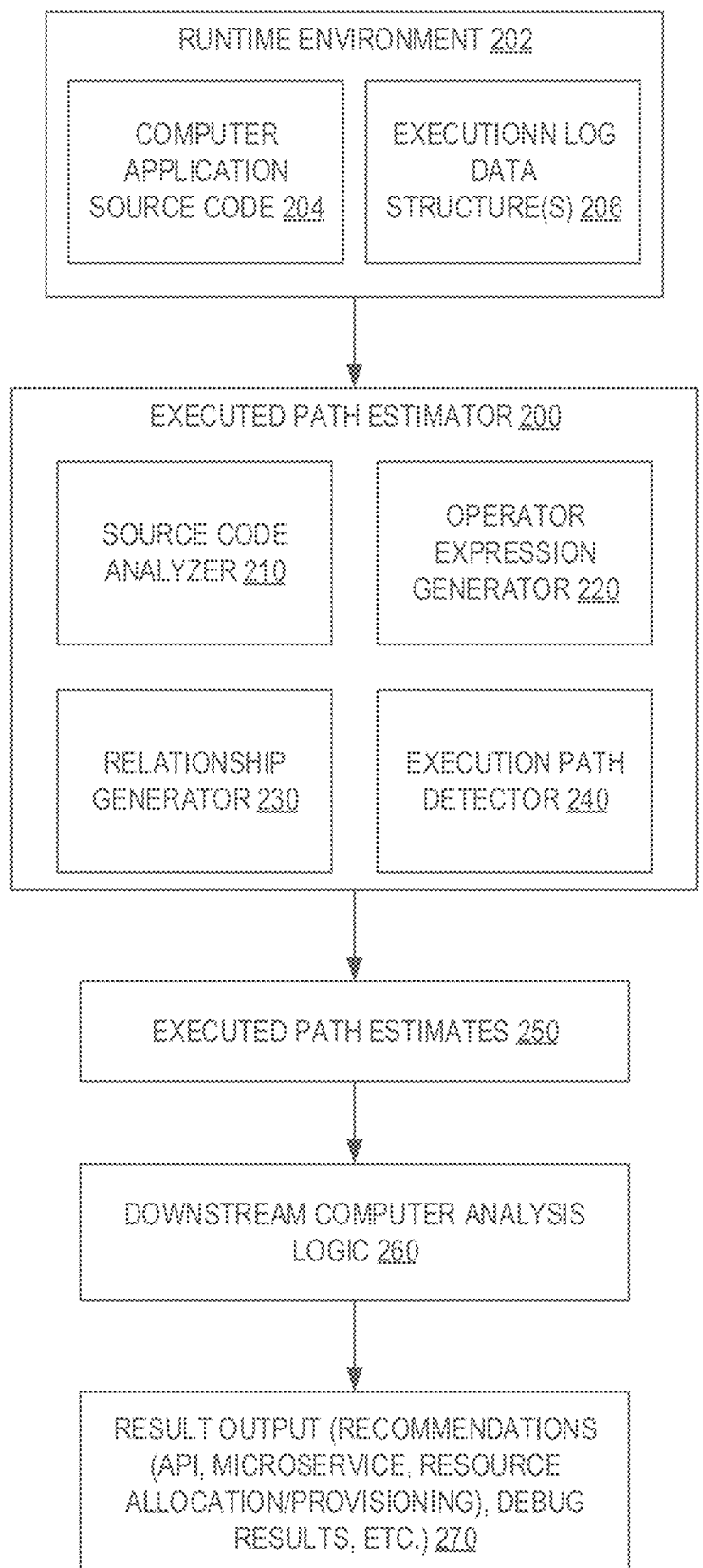
FIG. 2 is an example block diagram illustrating the primary operational components of an executed path estimator in accordance with one illustrative embodiment.

FIG. 2 is an example block diagram illustrating the primary operational components of an executed path estimator 200 in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., computer application source code and execution log data structures, and the resulting output may aid human beings, e.g., in debugging or identification of portions of computer application code that can be implemented as APIs or microservices during code modernization efforts. The invention is specifically directed to the automatically operating computer components directed to improving the way that executed paths in computer application logic are identified, and providing a specific solution that implements processing of computer application source code, execution log data structures, generation of control flow graphs, identification of paths in the control flow graphs, identification of inter-procedural paths, automated generation of expressions and relationships between these expressions and execution counts, and automated estimation of execution paths based on these relationships, which cannot be practically performed by human beings as a mental process and is not directed to organizing any human activity.

As shown in FIG. 2, the executed path estimator 200 includes a computer application source code path analyzer 210, an operator expression generator 220 that generates an expression for each operator on each path to represent the number of execution count by the number of instances of the operator appearing on the path, a relationship generator 230 that generates an operator expression-to-execution count relationship for each operator, and an execution path detector 240 that detects paths for each record in an execution log data structure, which includes an execution count profile. That is, the execution log data structure comprises various information including the execution count profile, which is utilized by the mechanisms of the illustrative embodiments. The execution count profile comprises multiple records, each of which represents the results for one execution of the target application logic. Each record may comprise multiple columns of information, with some of these columns representing the execution count for the target operators collected during the execution.

The operation of the executed path estimator 200 comprises the defining of a set of operators whose execution count can be counted at runtime from the given knowledge, i.e., the computer application source code 204 and execution log data structure(s) 206 of the runtime environment 202. The set of operators may be defined and implemented by the application logic provider, or other authorized users. In one illustrative embodiment, the operators are identified by the source code path analyzer 210 by analyzing the computer application source code 204 and the execution log data structure(s) 206. In some illustrative embodiments, this analysis may involve, for example, searching the application source code 204 and execution log data structure(s) 206 for instances of a character string corresponding to operators in the set of operators. The source code path analyzer 210 may identify the operators as any operators that have corresponding execution counts in the execution log data structure(s) 206. In some illustrative embodiments where the execution log data structure(s) 206 are data structures comprising System Management Function (SMF) type 110, subtype 1, class 3 performance data records for transaction processing by the computer application logic corresponding to the computer application source code 204, each "EXEC CICS READ", "EXEC CICS REWRITE", "EXEC CICS WRITE", "EXEC CISCS DELETE", "EXEC CICS LINK PROGRAM", and "EXEC SQL" operation of a CICS transaction in the records, for which there is execution count information, may be an operator.

The source code path analyzer 210 further operates to identify possible execution paths through the computer application (or program). The possible paths are identified by generating a control flow graph for the computer application based on the parsing and analysis of the computer application source code 204. Processes for parsing and analyzing source code to generate control flow graphs are generally known and thus, a more detailed explanation is not provided herein. For example, DMS® Software Reengineering Toolkit™, available from Semantic Designs℠, is a toolkit that can generate control and data flows from computer source code.

In some illustrative embodiments, the control flow graph may then be reduced based on the identified operators for which there are execution counts in the execution log data structure(s) 206. That is, nodes of the control flow graph that do not include an operator for which there is an execution count in the execution log data structure(s) 206 may be filtered out of the control flow graph data structure. It should be appreciated, however, that such a reduction in the control flow graph is optional and need not be performed in every embodiment.

Having generated the control flow graph data structure, paths through the control flow graph are identified from a start node to an end node. Each separate path may be identified and maintained as a separate potential or possible execution path for the computer application (or program). In addition, the source code path analyzer 210 may further identify any loop regions present in the control flow graph and assign a variable name representing the number of loop iteration count corresponding to each path in the loop. Thus, the source code path analyzer 210 generates a control flow graph data structure for the computer application source code 204 and analyzes the control flow graph data structure to identify the separate paths of the control flow graph, remove nodes of paths that do not have operators for which there are execution counts in the execution log data structure(s) 206, and generates variables for loops in the control flow graph data structure where those variables represent iterations of the loop.

For each identified path, and for those operators and external program calls existing on the path, the operator expression generator 220 generates an operator count expression that represents the execution count for that operator and/or external program calls, where the operator count expression is based on the number of instances of that operator/call appearing on the path and in a loop region, where the loop region is represented in the operator count expression as the corresponding generated variable that represents the number of iterations of the loop. In some illustrative embodiments, in order to generate the operator count expression for an operator/call, for each identified path, a list of the target operators and external program calls is generated in occurrence order, although the illustrative embodiments are not limited to generating the list of target operators specifically in occurrence order. Thus, if an operator/call occurs more than once in a path, then it will be represented in the list more than once.

Thus, based on the list of target operators and external program calls, for each operator and/or call in the path, an operator count expression is generated by accumulating the occurrence count in the list. For example, if an operator exists twice in the list, then the operator count expression for that operator becomes "2". If an operator exists on a path in a loop with the iteration count of N, then the operator count expression becomes "N". If an operator exists twice in a loop (N) and once outside the loop, then the operator count expression becomes "2N+1".

The operator expression generator 220 operates on the lists of target operators for each path and integrates the lists based on the inter-procedural call relationship. The execution count expressions for each counter are generated for each inter-procedural path. For paths among which all the expressions for all the operators are same, the operator expression generator 220 may merge those lists of expressions.

Thus, the operator expression generator 220 generates operator count expressions for each of the operators and operator count expression sets for each list of target operators and hence, each path, or merged path. Thereafter, the relationship generator 230 generates, for each operator in each operator count expression set, a relationship between the operator count expression and the actual execution count from the execution log data structure(s) 206. A solver of the relationship generator 230 determines if the relationship has a solution. For example, if the solver is a strict solver, then the result has the value either True or False based on whether the relationship may be solved (True) or not (False). If the solver is a relaxed solver, to reduce analysis time or resource consumption, then the result can have a value of possibility, e.g., a value between 0 and 1 where 0 represents False and 1 represents True, and any value in-between is a measure of possibility along the spectrum from false to true. In some cases, the solver may classify the relationship as True, False, or Possible if the value is somewhere between 0 and 1.

Based on the evaluation of the relationships, by the solver of the relationship generator 230, for each operator in each list, the execution path detector 240 evaluates the execution possibility for each list of target operators to determine its possibility of being an executed path in the computer application logic. For example, the execution path detector 240 evaluates the execution possibility for each list by determining if the results of the solver for the operators in the list indicate True, False, Possible, or whether the values along the possibility spectrum from 0 to 1 is equal to or below predetermined threshold values indicative of levels of possibility. For example, the execution path detector 240 may determine if all results of the solver for all operators in the list indicate True, in which case the execution possibility of the list is True. In making this evaluation, the execution path detector 240 may also determine if one or more results are False, in which case the execution possibility of the list of operators is False. In making this evaluation, the execution path detector 240 may also determine if one or more results of the solver indicate Possible, then the execution possibility of the list of operators is also Possible. Thus, for each list, and thus each corresponding path through the control flow graph, a determination is made as to whether that list/path is true, false, or possible.

The execution path detector 240 aggregates the paths whose equations are evaluated as True or Possible, or whose values indicate true or possible based on comparison to the predetermined threshold values. The aggregation provides the set of possible paths through the control flow graph of the computer application logic. These possible paths are the executed path estimates 250 that are output to downstream computer analysis logic 260. The downstream computer analysis logic 260 may operate on the executed path estimates 250 to generate additional results depending on the desired functionality of the downstream computer analysis logic 260. For example, the downstream computer analysis logic 260 may analyze the executed path estimates 250 with regard to execution frequency to identify hot spots in computer application logic execution for purposes of replacing such portions of computer application logic with APIs or microservices. In some cases, the downstream computer analysis logic 260 may evaluate the executed path estimates 250 to identify resource allocations or provisioning of resources to certain portions of computer application logic, e.g., spawning threads, allocating additional storage or processor resources, or the like. These results 270 may be output to a user via a computing device (not shown) for consideration by human operators.

The results may be used in various ways to optimize the computer application logic. For example, the results may be used to detect hot paths and optimize the application to improve performance for those hot paths. The illustrative embodiments provide a mechanism by which these hot paths may be identified through the estimation tools without additional instrumentation of the computer application logic, which may negatively impact performance of the computer application logic. The actual optimization of the hot paths may involve modifying or replacing the hot paths with application programming interface (API) calls, invoking microservices, or the like, where these APIs and microservices provide a comparable functionality to the hot paths, but provide improved performance. This may be part of an application modernization process, for example, to modernize legacy application code or the like. Of course, other optimizations based on the estimation of executed paths in computer application logic performed by the mechanisms of the illustrative embodiments may be implemented without departing from the spirit and scope of the present invention.

Figure 3:
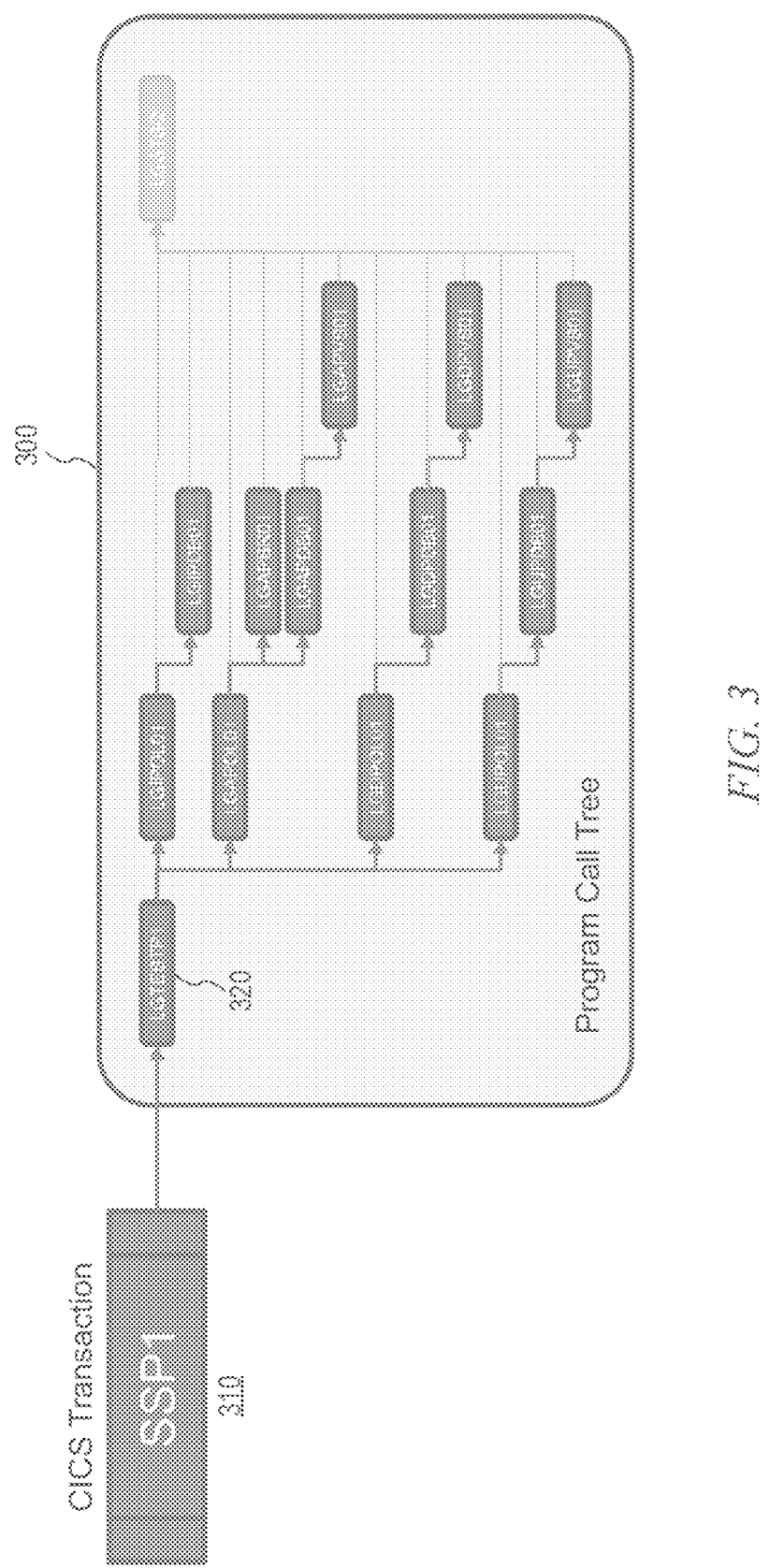
FIG. 3 is an example diagram of a call graph of a transaction in accordance with one illustrative embodiment.

As discussed above, one of the initial operations performed by the source code path analyzer 210 is to generate a control flow graph based on the computer application source code 204 and the execution log data structure(s) 206. FIG. 3 is an example diagram of a call graph of a transaction processing by an example computer application in accordance with one illustrative embodiment, which shows the various procedure calls and dependencies. The call graph of FIG. 3 may be obtained, or otherwise included in the computer application source code 204 in FIG. 2, for example, or generated by the source code path analyzer 210 in FIG. 2. FIG. 4 is an example diagram illustrating a portion of an execution log data structure, such as execution log data structure 206 in FIG. 2, for a transaction in accordance with one illustrative embodiment, such as the transaction SSP1 shown in the call graph of FIG. 3. The example shown in FIG. 3 is for a simplified CICS transaction application written in COBOL. For each execution (or instance) of the transaction SSP1 310, the program LGTESTP1 is called, which in turn calls the other programs represented by rectangular boxes 320 in the program call tree 300. The program call tree 300 represents the inter-procedural (or program) calls for processing the instance of transaction SSP1. In this running example, looking now to FIG. 4 as well, the example focuses on the CICS commands FCGETCT, FCPUTCT, FCADDCT, PCLINKCT, and DB2REQCT. These fields hold the execution count of "EXEC CICS READ", "EXEC CICS REWRITE", "EXEC CICS WRITE", "EXEC CICL LINK PROGRAM", and "EXEC SQL", respectively. To simplify the example, all paths including the call to LGSTSQ are omitted because it is confirmed that LGSTSQ was not called in the example.

As shown in FIG. 4, the execution log data structure 400 includes a set of records for instances of an execution of the transaction SSP1 in FIG. 3, referred to as the execution count profile. The example in FIG. 4 is of a SMF 110, subtype 1, class 3 execution log data structure. While this SMF data structure is used as an example, the illustrative embodiments are not limited to such and other execution log data structures that store execution count information for operators may be used without departing from the spirit and scope of the present invention.

As shown in FIG. 4, each record in the execution log data structure 400 shows the execution count profile for an execution of a transaction, in addition to the transaction name and the entry program name. A first set of fields 410 hold the transaction name, transaction identifier, and program name. A second set of fields 420 hold the execution count information for the transaction. It is this second set of fields 420 that provide execution count information for operators that may be used in accordance with the mechanisms of the illustrative embodiments to estimate the execution paths in the execution of the corresponding computer application logic. That is, the fields 420 provide the execution counts that may be used when generating the relationships for identifying execution paths through the computer application logic from the control flow graph analysis performed by the illustrative embodiments.

For example, as discussed previously with regard to FIG. 2, the executed path estimator 200 includes a computer application source code path analyzer 210, an operator expression generator 220 that generates an expression for each operator on each path to represent the number of execution count by operators appearing on the path, a relationship generator 230 that generates an operator expression-to-execution count relationship for each operator, and an execution path detector 240 that detects paths for each record in an execution log data structure 206, where each record has an execution count profile. The execution count information in fields 420 informs the computer application source code path analyzer 210 as to the set of operators whose execution count can be counted at runtime. The execution count information in fields 420 may also be used to reduce of filter the control flow graph data structure with regard to nodes of the control flow graph that do not include an operator for which there is execution count information in fields 420. The execution count information in fields 420 may also be used by the executed path estimator 200 to identify counters that were not counted in the execution profile of the execution log data structures 206 at all, such that it is possible to skip the paths including such operator count expressions. The relationship generator 230 may utilize the execution count fields information of fields 420 to generate, for each operator in each operator count expression set, a relationship between the operator count expression and the actual execution count from the execution log data structure(s) 206, i.e., the fields 420 for the operator. Thereafter, the solver tries to solve the relationship and if possible, the corresponding paths for which each relationship is true or possible are selected as estimated execution paths of the computer application logic.

Figure 5A:
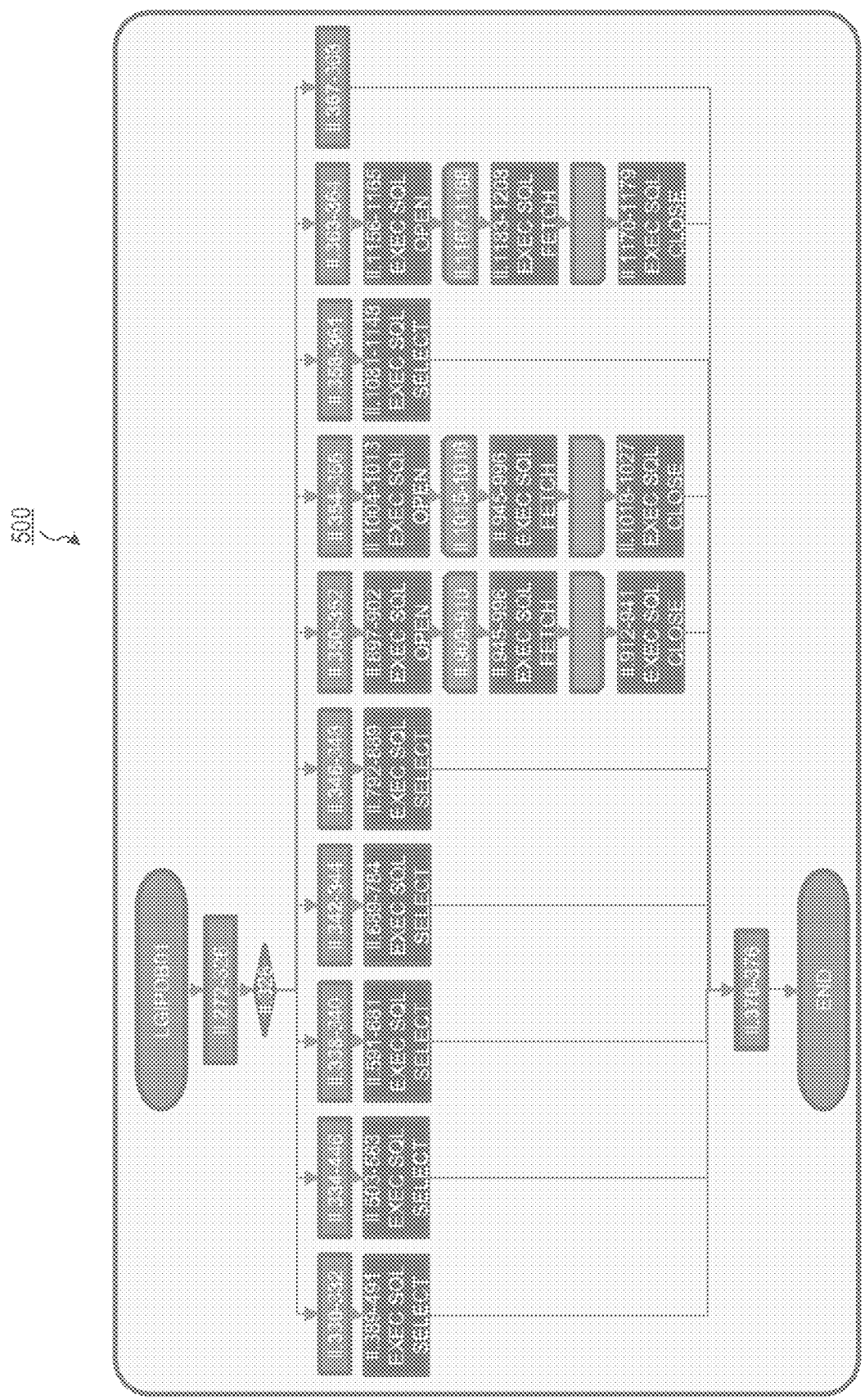
FIG. 5A is an example diagram of a control flow graph for a program in accordance with one illustrative embodiment.

FIG. 5A is an example diagram of a control flow graph for a program in accordance with one illustrative embodiment. As shown in FIG. 5A, the control flow diagram 500 represents the various control flows through the program code for the program LGIPDB01, concentrating again on the CICS commands mentioned previously. An example of pseudocode for the program LGIPDB01 is shown in FIG. 5B. Each branch of the control flow graph 500 represents a potential execution flow through the program from the start node (LGIPDB01) to the end node. As opposed to the call graph of FIG. 3 which shows the calls between programs, the control flow graph 500 shows the control flow pathways within a program.

The illustrative embodiments, once such a control flow graph is generated based on computer application (program) source code analysis, traverses and evaluates each of the paths of the control flow graph 500 to determine operators for which there are execution count information collected in the execution log data structures(s) (see FIG. 4), and to perform the previously described operations to determine which paths are estimated executed paths through the computer program logic. The generation of such control flow graphs from computer application (program) source code is generally known in the art and any suitable tool that generates such control flow graphs may be utilized without departing from the spirit and scope of the present invention.

Figure 6:
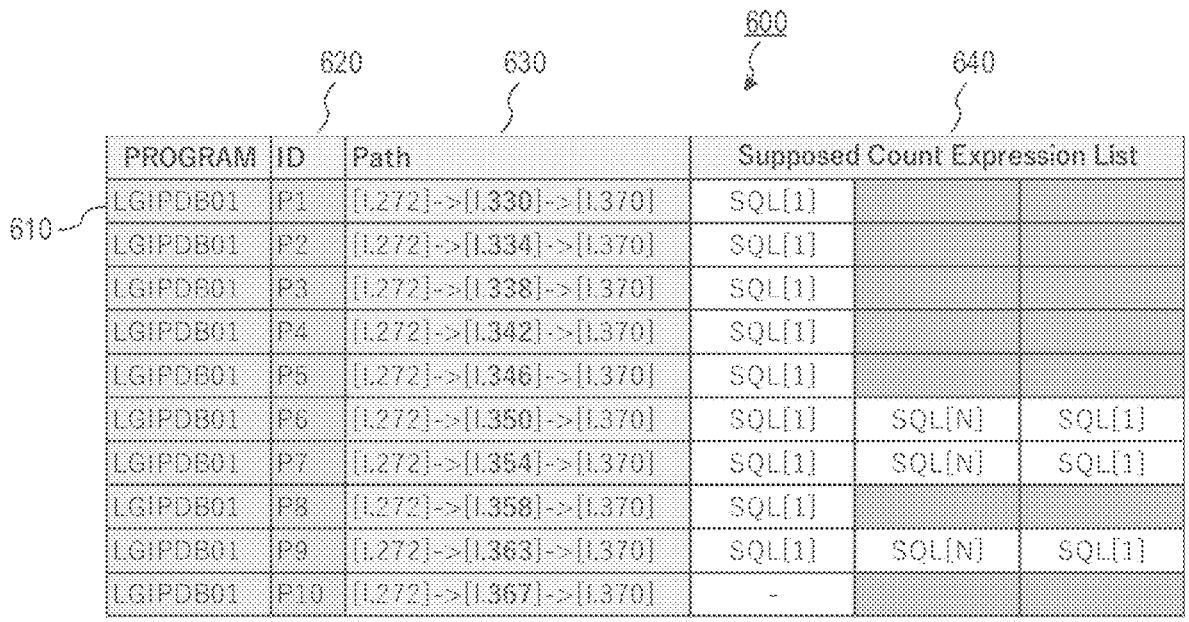
FIG. 6 is an example diagram of a count expression list data structure in accordance with one illustrative embodiment.

When traversing the control flow graph 500 the operators for which execution count information is collected in the execution log data structure(s) are identified and based on these identified operators, lists of operators and external program calls are generated for each path through the control flow graph 500. FIG. 6 is an example diagram of a count expression list data structure in accordance with one illustrative embodiment. As shown in FIG. 6, an operation list data structure 600 includes records 610 for each of the paths of the program, with each record having a path being labeled by a path label 620, e.g., P1-P10 in the depicted example. For example, as shown in FIG. 6, path P1 comprises the path 630 from node [I.272] to node [I.330] to node [I.370] in the control flow graph data structure 500 of FIG. 5. Each record 610 further includes the list of operators 640 which have execution count information in the execution log data structure(s) and which appear in the path. While the depicted example program shown in the control flow graph 500 of FIG. 5 does not have an external program call, if such a call is found in a control flow graph 500, the target program name is inserted into the operation list data structure 600 for the corresponding paths and this external call information is used to identify inter-procedural paths, so as to handle cases where the callee program terminates the program without a return.

Figure 7:
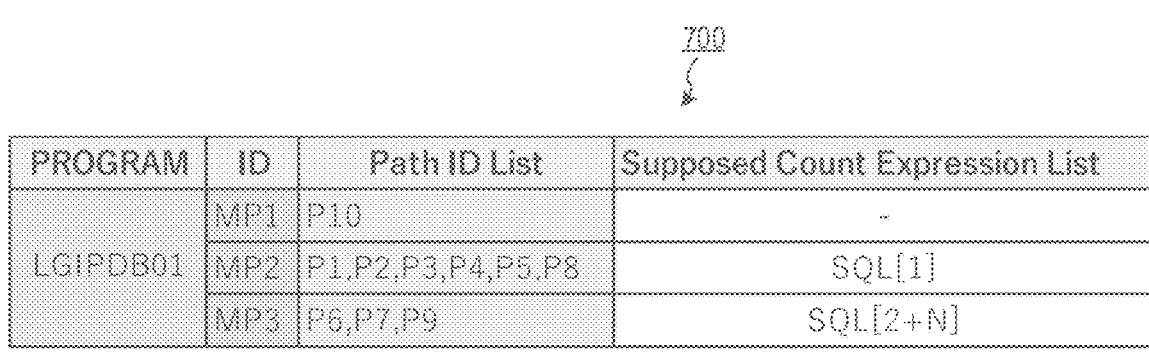
FIG. 7 is an example diagram of a merged count expression list data structure in accordance with one illustrative embodiment.

The operation list data structure 600 may be analyzed to identify paths, i.e., records, where the list of operators is the same and merge the paths having the similar list of operators. FIG. 7 is an example diagram of a merged count expression list data structure in accordance with one illustrative embodiment. The merged count expression list data structure 700 is a merged version of the operator list data structure 600 where paths having similar lists of operators are merged together. In this depicted example, looking at the example records in operator list data structure 600 of FIG. 6, it can be seen that paths P1, P2, P3, P4, P5, and P8 each have only the operator SQL[1] and thus, may be merged together as a merged path MP2. Similarly, paths P6, P7, and P9 have operators SQL[2+N] and can be merged into merged path MP3. Path P10 does not have any other paths with a similar list of operators, and thus, is its own merged path MP1.

As noted above, when generating the list of operators for each path in the control graph data structure, calls to other programs, i.e., inter-procedural calls, are identified and included in the list of operators. These inter-procedural calls are used to identify inter-procedural paths and then generate, for each inter-procedural path, an operator execution count expression list. In order to generate this operator execution count expression list, the merged count expression list data structures 700 for each of the programs is first generated in a manner similar to described above, e.g., see discussion of FIGS. 6-7. The merged count expression list data structures 700 are then used to identify those records having inter-procedural calls and, in combination with the call graph data structure, may be used to identify inter-procedural paths, or call paths, for the computer application and associate with each path, an operator count expression list specifying the operator execution counts for inter-procedural operators, i.e., program calls, e.g., reads/writes/rewrites, deletes, SQL, and link operators.

Figure 8B:
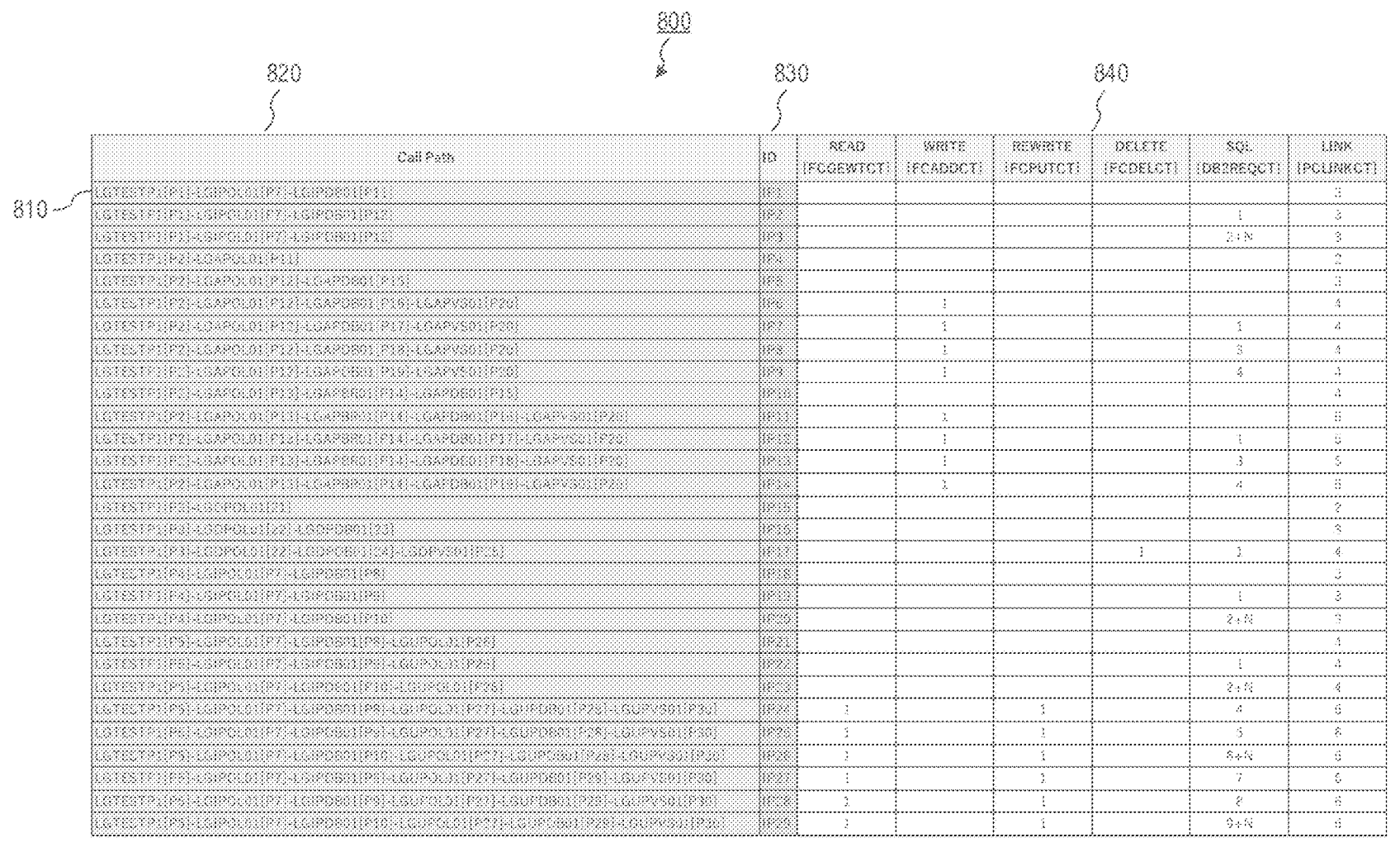

FIGS. 8A-8B are example diagrams illustrating the generation of a merged count expression list for inter-procedural paths in accordance with one illustrative embodiment. FIG. 8A shows the merged count expression list data structures 700 for each of the programs in the call graph of FIG. 3. In this example, the inter-procedural call operators are shown in the records for each of the control flow graph paths. This information is used to construct the inter-procedural paths in the merged count expression list data structure 800 in FIG. 8B. As shown in FIG. 8B, each record 810 of data structure 800 includes a call path 820 with a corresponding inter-procedural path identifier IP1-IP29 830, and corresponding counts of inter-procedural call operators, i.e., the count expression list 840.

Figure 9:
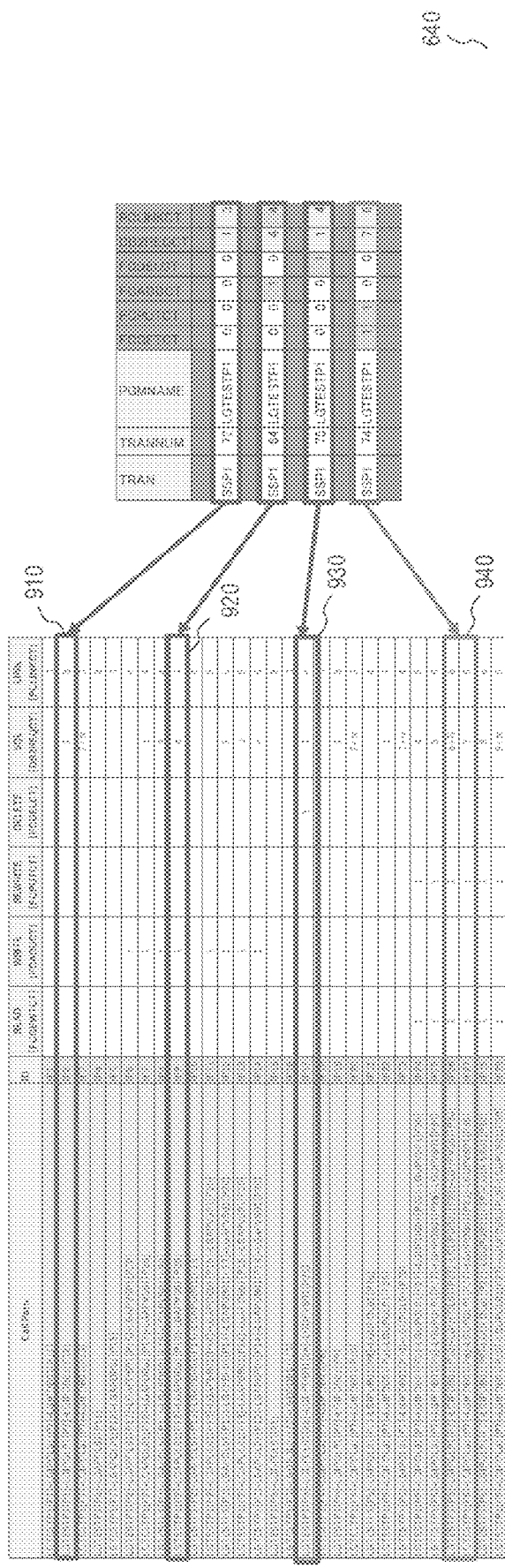
FIG. 9 is an example diagram illustrating the correlation of the merged count expression list for inter-procedural paths with the execution log data structures in accordance with one illustrative embodiment.

FIG. 9 is an example diagram illustrating the correlation of the merged count expression list for inter-procedural paths with the execution log data structures in accordance with one illustrative embodiment. As shown in FIG. 9, for each execution profile record in the execution log data structure 206, a determination is made as to whether the count expression list 810 for each path in the merged count expression list data structure 800 matches the profiled value in the execution log data structure 206. For each counter, the illustrative embodiments make relationship, e.g., <operator counter expression>=profiled value, and solve the relationship to check if at least one solution exists. If no relationship is defined, then the constant zero is used instead.

Once the relationships are defined and checked to determine if there is a solution, e.g., the relationship is evaluated to be True or Possible, then these relationships are evaluate to determine the execution possibility for the paths in the merged count expression list data structure 800. In the depicted example of FIG. 9, the first three records in the execution log data structure 206 match the paths, IP2, IP9, and IP17, respectively, shown as elements 910, 920, and 930. Thus, these paths are estimated as the executed path for these records. On the other hand, for the last record, two paths are detected, shown as element 940, because both the relationships for the operator SQL command, "6+N=7" and "7=7" can be solved. Therefore, two possibly executed paths 940 are detected for that record. Thus, call paths whose operator count estimates in the merged count expression list data structure 800 that are a solvable function of the execution counts in the execution log data structure(s) 206 are identified and determined to be the estimated execution paths through the computer application logic. This is done without having to introduce additional instrumentation or execution count generation logic specifically for identifying execution paths.

Thus, the execution paths of a computer application or program may be estimated from intra-procedural and inter-procedural process execution counts without having to introduce additional instrumentation into the source code. The illustrative embodiments utilize appearance counts and execution counts of processes that are not used for execution path identification, as a mechanism for estimating execution paths through the computer application or program. This provides estimated execution path identification which may then be used to perform further downstream computer analysis operations, such as hot path identification, selection of candidate paths for modification, or replacement, to call/invoke APIs and microservices, debugging, and computer application modernization efforts.

From the above, it is clear that the illustrative embodiments provide an improved computing tool and improved computing tool functionality/operations to detect the execution paths of computer application logic from a execution count profile in a execution log without modifying the source code of the computer application logic. Existing techniques require either to modify the source code to insert some instrumentation code to detect the execution paths, or to use performance costly runtime functions, such as debugging functions, to identify executed paths. Without such instrumentation of performance degrading runtime functions, existing techniques cannot be used to detect the execution path. The mechanisms of the illustrative embodiments fit especially well with mainframe executed computer application logic and such mainframe execution environments and can be an important tool for enterprises using mainframe applications that are interested in modernizing or refactoring their applications.

Figures 10A, 10B:
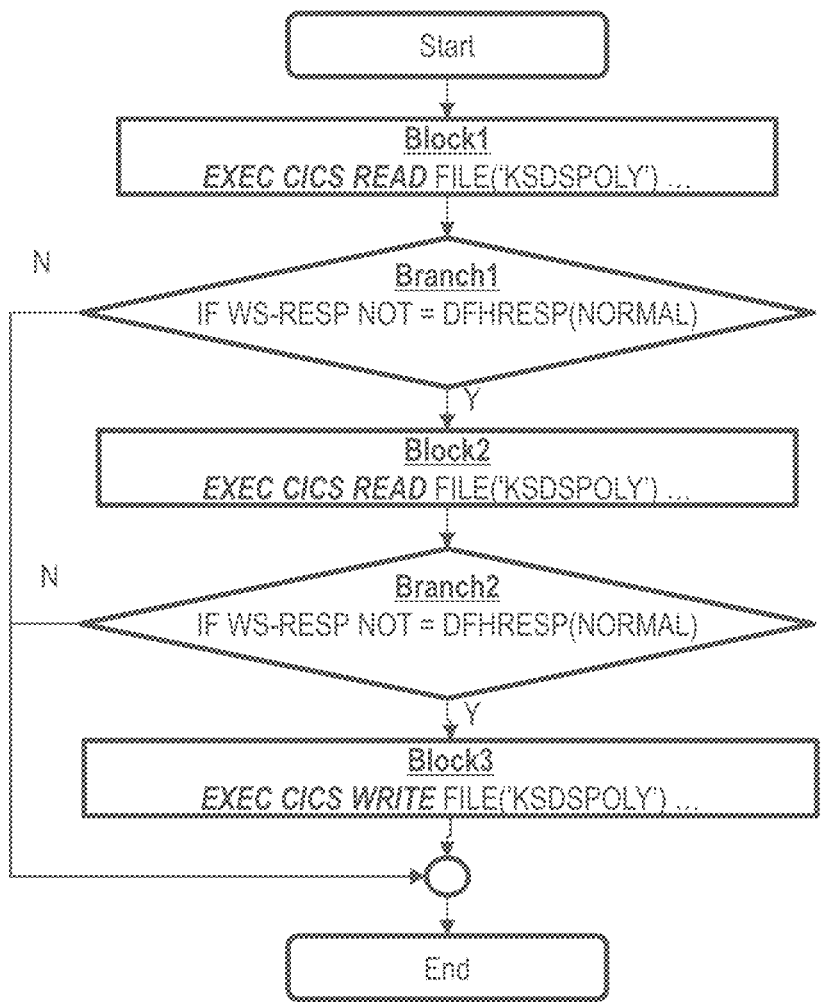
FIGS. 10A-10B provide an example of a simplified CICS transaction program, written in COBOL, which includes two CICS operations whose execution counts are collected by SMF, in accordance with one illustrative embodiment.

To further illustrate example operations of the improved computing tool and improved computing tool functionality of one or more of the illustrative embodiments, examples are provided in FIGS. 10A-12F. These examples are of CICS transaction programs of increasing complexity. For example, FIGS. 10A-10B provide an example of a simplified CICS transaction program, written in COBOL, which includes two CICS operations whose execution counts are collected by SMF. FIGS. 11A-11D show an example of a CICS transaction program with a loop and including two CICS operations whose execution counts are collected by SMF. FIGS. 12A-12F show an example of a CICS transaction program that includes two program calls where the main program includes two CICS operators, EXEC CICS LINK PROGRAM, and the callee program, WORK, is the same program as depicted in FIGS. 10A-10B. Each of these examples will now be discussed in greater detail.

With reference to the example shown in FIGS. 10A-10B, FIG. 10A shows the example CICS transaction program code and FIG. 10B shows the example control flow graph corresponding to the program of FIG. 10A. In the example of FIG. 10A, EXEC CICS READ is an operation to read data from a file and EXEC CICS WRITE is an operation to write data to a file. As shown in FIG. 10B, generating the control flow graph results in the depicted flow having 3 paths as follows, which may be identified by traversing the control flow graph:

Path1: Start→Block1→Branch1→Block2→Branch2→Block3→End

Path2: Start→Block1→Branch1→Block2→Branch2→End

Path3: Start→Block1→Blanch1→End

By traversing each path, a list of CICS operators can be generated:

Path1: ["EXEC CICS READ", "EXEC CICS READ", "EXEC CICS WRITE"]

Path2: ["EXEC CICS READ", "EXEC CICS READ"]

Path3: ["EXEC CICS READ"]

For each path and each operator, an expression (constant for this case) is generated by the appearance count in the list:

Path1
  EXEC CICS READ: 2
  EXEC CICS WRITE: 1
Path2
  EXEC CICS READ: 2
  EXEC CICS WRITE: 0
Path3
  EXEC CICS READ: 1
  EXEC CICS WRITE: 0

Here, suppose that the execution count profile of this program for an execution shows {2, 0} for "EXEC CICS READ" and "EXEC CICS WRITE" respectively, and the equation ("expression"="execution count") for each path and operator becomes as follows:

Path1
  EXEC CICS READ: 2=2→TRUE, this equation can be solved
  EXEC CICS WRITE: 1=0→FALSE, no solution exists Path2
　EXEC CICS READ: 2=2→TRUE, this equation can be solved
　EXEC CICS WRITE: 0=0→TRUE, this equation can be solved
Path3
　EXEC CICS READ: 1=2→FALSE, no solution exists
　EXEC CICS WRITE: 0=0→TRUE, this equation can be solved
As the result, all the equations for the path2 are valid or true. So, it is estimated that Path2 is executed for the execution.

Figure 11B:
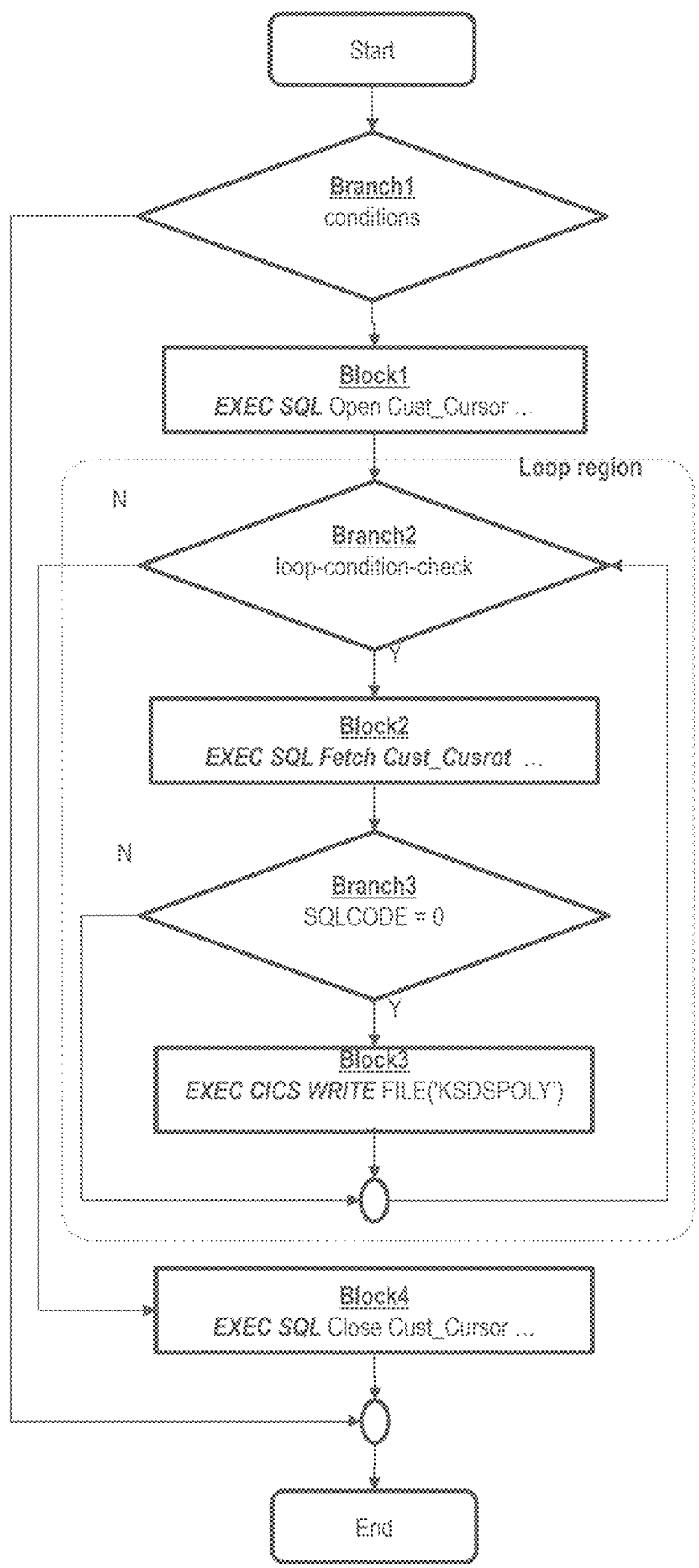

FIGS. 11A-11D show an example of a CICS transaction program with a loop and including two CICS operations whose execution counts are collected by SMF. The two CICS operations are EXEC SQL which issues a SQL query to a database, and EXEC CICS WRITE which writes data to a file. A control flow graph is generated as shown in FIG. 11B, and loop region detection is performed. If the program has some code loops, all the loop regions are detected and separated from the top-level control flowgraph, such as the loop region denoted by the dashed box in FIG. 11B. For the top-level control flow graph as shown in FIG. 11C, each loop region is reduced into a node, e.g., the node denoted "Loop1" in FIG. 11C. For each loop region as shown in FIG. 11D, the corresponding control flow graph is generated. In the depicted flow graph of FIG. 11D, the start node is connected to the loop entry node, and all backward edges are connected to the end node.

For all the control flowgraphs, all the paths on the graph are detected by traversing the graph from the Start node to the End node:
Top-Level Control Flow Graph (FIG. 11C):
　Path1: Start→Branch1→Block1→Loop1→Block4→End
　Path2: Start→Branch1→End
Loop1 control flow graph (FIG. 11D):
　Path-L1:
　　Start→Branch2→Block2→Branch3→Block3→End
　Path-L2: Start→Branch2→Block2→Branch3→End
　Path-L3: Start→Branch3→End
By traversing each path, a list of CICS operators can be generated:
　Path1: ["EXEC SQL", "EXEC SQL"]
　Path2: [ ]
　Path-L1: ["EXEC SQL", "EXEC CICS WRITE"]
　Path-L2: ["EXEC SQL"]
　Path-L3: [ ]
For each path and operator, the number of instances, or appearances, of the operator is counted:
Path1
　EXEC SQL: 2
　EXEC CICS WRITE: 0
Path2
　EXEC SQL: 0
　EXEC CICS WRITE: 0
Path-L1
　EXEC SQL: 1
　EXEC CICS WRITE: 1
Path-L2
　EXEC SQL: 1
　EXEC CICS WRITE: 0
Path-L3
　EXEC SQL: 0
　EXEC CICS WRITE: 0
　A variable is assigned to each path in the Loop control flow graph:
　Path-L1: X
　Path-L2: Y
　Path-L3: Z For each path and each operator, an expression (constant for this case) is generated by the appearance count in the list. If loop nodes are included, the appearance count for all the paths corresponding to the loop are determined based on a multiplying of the corresponding variables. In this case, since Path1 includes Loop1, the appearance count of all the paths, i.e., Path-L1, Path-L2, and Path-L3, in the loop are added based on a multiplying of the variables, X, Y, and Z, respectively:
Path1
　EXEC SQL: $2+(1*X)+(1*Y)+(0*Z)=2+X+Y$
　EXEC CICS WRITE: $0+(1*X)+(0*Y)+(0*Z)=X$
Path2
　EXEC SQL: 0
　EXEC CICS WRITE: 0

Here, it is assumed as an example that the execution count profile of this program for an execution shows {10, 8} for "EXEC SQL" and "EXEC CICS WRITE" respectively, and as a result, the equation ("expression"="execution count") for each path and operator becomes as follows:
Path1
　EXEC SQL: $2+X+Y=10$ True, this equation can be solved
　EXEC CICS WRITE: $X=8$ True, this equation can be solved
Path2
　EXEC SQL: 0=10 INVALID, False, no solution exists
　EXEC CICS WRITE: 0=8 INVALID, False, no solution exists
As the result, all the equations for the Path1 are true or valid. Thus, it is estimated that Path1 is executed.

FIGS. 12A-12F show an example of a CICS transaction program that includes two program calls where the main program includes two CICS operators, EXEC CICS LINK PROGRAM, and the callee program, WORK, is the same program as depicted in FIGS. 10A-10B. The Main program, shown in FIG. 12A calls the callee program WORK, shown in FIG. 12B, by the CICS operation, EXEC CICS LINK PROGRAM.

Figure 12C:
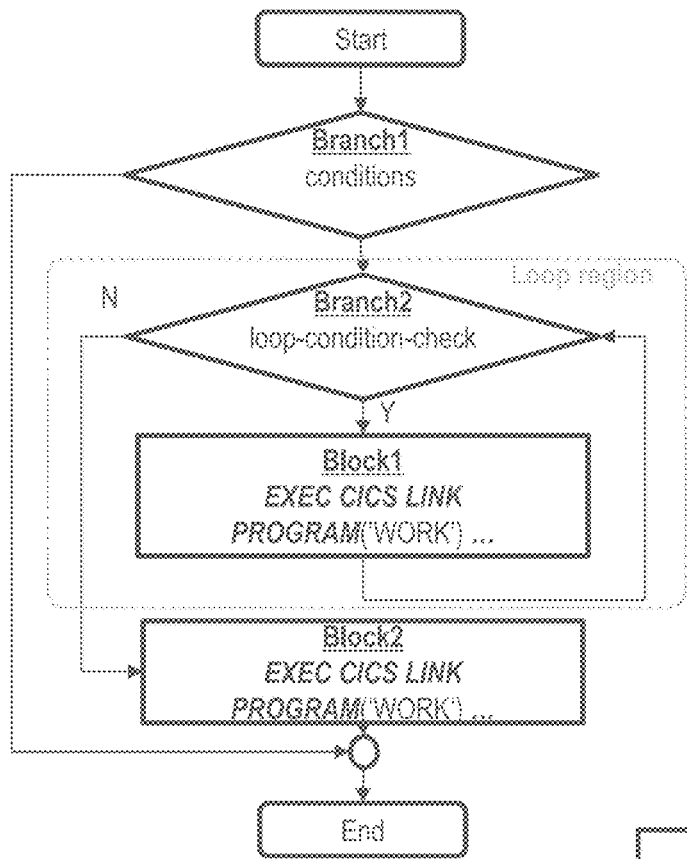
Figure 12D:
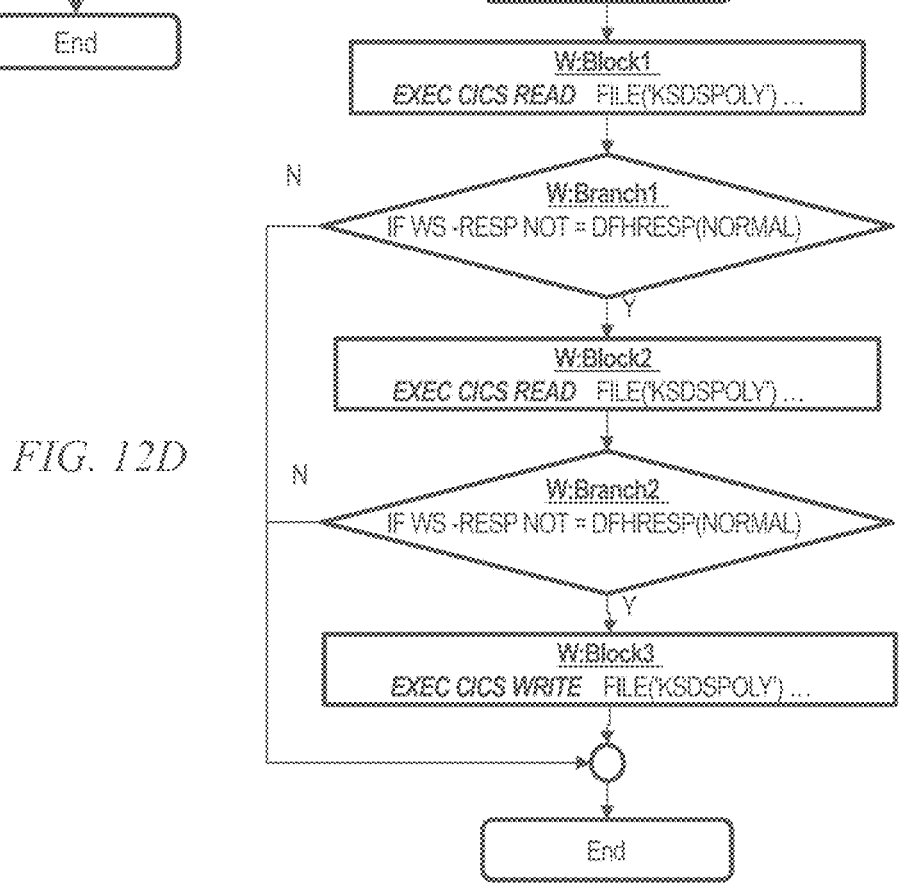
Figure 12E:
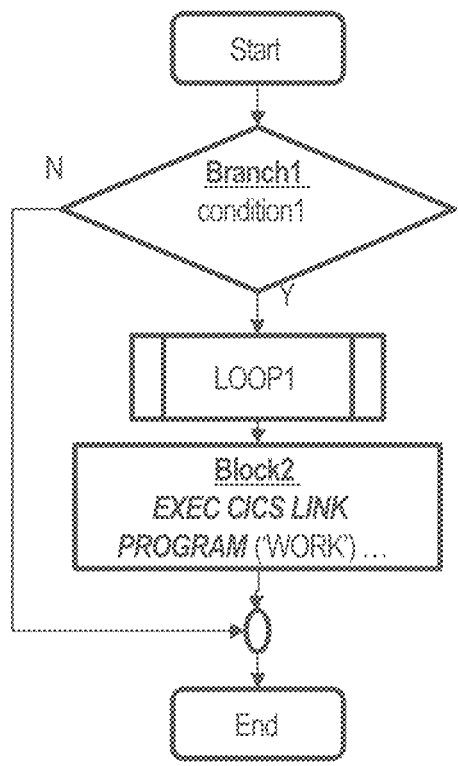
Figure 12F:
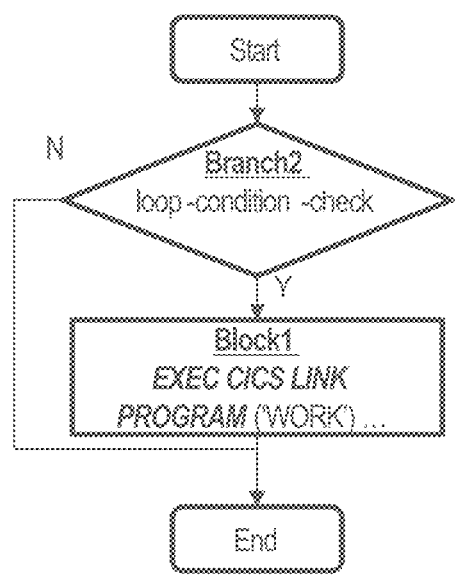

A control flow graph for the Main program and the Callee program WORK are generated as shown in FIGS. 12C and 12D, respectively, and loop region detection is performed. Since the Main program has a loop, the loop region is detected and separated from the top-level control flowgraph. For the top-level control flowgraph as shown in FIG. 12E, each loop region is reduced into a node, e.g., node Loop1 in FIG. 12E. For each loop region as shown in FIG. 12F, the corresponding control flow graph is generated. In the control flow graph, the Start node is connected to the loop entry node, and all backward edges are connected to the End node.

For all the control flow graphs, all the paths on the graph are detected by traversing the graph from Start node to End node:
Top-Level Control Flowgraph (FIG. 12E):
　Path1: Start→Branch1→Loop1→Block2→End
　Path2: Start→Branch1→End
Loop1 Control Flow Graph (FIG. 12F):
　Path-L1: Start→Branch2→Block1→End
　Path-L2: Start→Branch2→End
Callee Program—WORK (FIG. 12D):
　WORK-Path1:Start→W:Block1→W:Branch1→W: Block2→W:Branch2→W:Block3→End
　WORK-Path2:　　Start→W:Block1→W:Branch1→W: Block2→W:Branch2→End
　WORK-Path3: Start→BW:lock1→W:Blanch1→End
By traversing each path on each graph, two lists are generated: one is a list of CICS operators, whose execution counts are collected at runtime, and the other is a list of callee programs, which are called from the call operators in the path. In this example, Path1 and Path-L1 have a call operator, EXEC CICS LINK PROGRAM, both of which call the program WORK, and other paths have no call operator.
    Path1: operators=["EXEC CICS LINK PROGRAM"], calls=["WORK"]
    Path2: operators=[ ], calls=[ ]
    Path-L1: operators=["EXEC CICS LINK PROGRAM"] calls=["WORK"]
    Path-L2: operators=[ ], calls=[ ]
    WORK_Path1: operators=["EXEC CICS READ", "EXEC CICS READ", "EXEC CICS WRITE"], calls=[ ]
    WORK_Path2: operators=["EXEC CICS READ", "EXEC CICS READ"], calls=[ ]
    WORK_Path3: operators=["EXEC CICS READ"], calls=[ ]

By traversing the operator list for each path, the number of appearance is counted for each operator:
Path1
    EXEC CICS READ: 0
    EXEC CICS WRITE: 0
    EXEC CICS LINK PROGRAM: 1
Path2
    EXEC CICS READ: 0
    EXEC CICS WRITE: 0
    EXEC CICS LINK PROGRAM: 0
Path-L1
    EXEC CICS READ: 0
    EXEC CICS WRITE: 0
    EXEC CICS LINK PROGRAM: 1
Path-L2
    EXEC CICS READ: 0
    EXEC CICS WRITE: 0
    EXEC CICS LINK PROGRAM: 0
WORK_Path1
    EXEC CICS READ: 2
    EXEC CICS WRITE: 1
    EXEC CICS LINK PROGRAM: 0
WORK_Path2
    EXEC CICS READ: 2
    EXEC CICS WRITE: 0
    EXEC CICS LINK PROGRAM: 0
WORK_Path3
    EXEC CICS READ: 1
    EXEC CICS WRITE: 0
    EXEC CICS LINK PROGRAM: 0

For each path including call operators, the inter-procedural paths are generated by combining all the callee paths. In this example, Path1 and Path-L1 include a call operator, both of which call the program WORK, and the program WORK has three paths, WORK-Path1, WORK-Path2, and WORK-Path3. Therefore, three inter-procedural paths are generated both for Path1 and Path-L1. For each inter-procedural path, the number of the instance, or appearance, count for each operator is aggregated by adding the counts for all the combined paths:
Path1
Path1_WORK_Path1
    EXEC CICS READ: 2
    EXEC CICS WRITE: 1
    EXEC CICS LINK PROGRAM: 1
Path1_WORK-Path2
    EXEC CICS READ: 2
    EXEC CICS WRITE: 0
    EXEC CICS LINK PROGRAM: 1
Path1_WORK-Path3
    EXEC CICS READ: 1
    EXEC CICS WRITE: 0
    EXEC CICS LINK PROGRAM: 1
Path2
    EXEC CICS READ: 0
    EXEC CICS WRITE: 0
    EXEC CICS LINK PROGRAM: 0
Path-L1
Path-L1_WORK-Path1
    EXEC CICS READ: 2
    EXEC CICS WRITE: 1
    EXEC CICS LINK PROGRAM: 1
Path-L1_WORK-Path2
    EXEC CICS READ: 2
    EXEC CICS WRITE: 0
    EXEC CICS LINK PROGRAM: 1
Path-L1_WORK-Path3
    EXEC CICS READ: 1
    EXEC CICS WRITE: 0
    EXEC CICS LINK PROGRAM: 1
Path-L2
    EXEC CICS READ: 0
    EXEC CICS WRITE: 0
    EXEC CICS LINK PROGRAM: 0

A variable is assigned to each path in the Loop control flow graph:
    Path-L1_WORK-Path1: $X$
    Path-L1_WORK-Path2: $Y$
    Path-L1_WORK-Path3: $Z$
    Path-L2: $W$ For each path and each operator, an expression (constant for this case) is generated by the appearance count in the list. If loop nodes are included, the appearance counts for all the paths corresponding to the loop are determined based on a multiplying of the corresponding variables. In this case, since Path1 originally includes Loop1, and the corresponding inter-procedural paths, Path1_WORK-Path1, Path1_WORK-Path2, and Path1_WORK-Path3 still include Loop1. In addition, Since the path, Path-L1, is replaced with three inter-procedural paths, Loop1 has 4 paths in total, Path-L1-WORK-Path, Path-L1_WORK-Path2, Path-L1_WORK_Path3, and Path_L2. The instance, or appearance, count of these paths are added to the caller paths based on a multiplying of the corresponding variables:
Path1_WORK-Path1
    EXEC CICS READ: $2+(2*X)+(2*Y)+(1*Z)+(0*W)=2+2X+2Y+Z$
    EXEC CICS WRITE: $1+(1*X)+(0*Y)+(0*Z)+(0*W)=1+X$
    EXEC CICS LINK PROGRAM: $1+(1*X)*(1*Y)(+(1*Z)+(0*W)=1+X+Y+Z$
Path1_WORK-Path2
    EXEC CICS READ: $2+(2*X)+(2*Y)+(1*Z)+(0*W)=2+2X+2Y+Z$
    EXEC CICS WRITE: $0+(1*X)+(0*Y)+(0*Z)+(0*W)=X$
    EXEC CICS LINK PROGRAM: $1+(1*X)*(1*Y)(+(1*Z)+(0*W)=1+X+Y+Z$
Path1_WORK-Path3
    EXEC CICS READ: $1+(2*X)+(2*Y)+(1*Z)+(0*W)=1+2X+2Y+Z$
    EXEC CICS WRITE: $0+(1*X)+(0*Y)+(0*Z)+(0*W)=X$
    EXEC CICS LINK PROGRAM: $1+(1*X)*(1*Y)(+(1*Z)+(0*W)=1+X+Y+Z$ Path2
    EXEC CICS READ: 0
    EXEC CICS WRITE: 0
    EXEC CICS LINK PROGRAM: 0

Here, it is assumed as an example that the execution count profile of this program for an execution shows {2, 0, 2} for EXEC SQL and EXEC CICS LINK PROGRAM respectively, and thus, the equation ("expression"="execution count") for each path and operator becomes as follows (where again True means that there is a possible solution identified by a solver, and False means that there is no identified solution by the solver):

Path1_WORK-Path1
    EXEC CICS READ: $2+2X+2Y+Z=2$; True
    EXEC CICS WRITE: $1+X=0$; False
    EXEC CICS LINK PROGRAM: $1+X+Y+Z=2$; True
Path1_WORK-Path2
    EXEC CICS READ: $2+2X+2Y+Z=2$; True
    EXEC CICS WRITE: $X=0$; True
    EXEC CICS LINK PROGRAM: $1+X+Y+Z=2$; True
Path1_WORK-Path3
    EXEC CICS READ: $1+2X+2Y+Z=2$; True
    EXEC CICS WRITE: $X=0$; True
    EXEC CICS LINK PROGRAM: $1+X+Y+Z=2$; True
Path2
    EXEC CICS READ: $0=2$; False
    EXEC CICS WRITE: $0=0$; False
    EXEC CICS LINK PROGRAM: $0=2$; False As the result, all the equations for the Path1_WORK-Path2 and Path1_WORK-Path3 are true or valid. Thus, it is estimated that these two paths are executed.

In some illustrative embodiments, if the solver can handle the relationship of equations among operators, it could estimate that only Path1_WORK-Path3 could be executed like the following deduction. For Path1_WORK-Path2, from the equation of "EXEC CICS READ", it was found that $X=0$, $Y=0$, and $Z=0$ From the equation of "EXEC CICS LINK PROGRAM", it is found that $X+Y+Z=1$ Since these results are contradictory, it is estimated that Path1_WORK-Path2 is not executed. For Path1_WORK-Path3, from the equation of "EXEC CICS LINK PROGRAM" and "EXEC CICS WRITE", $X=0$ and $Y+Z=1$. From the equation of "EXEC CICS READ" and the above results, it is found that $Y=0$ and $Z=1$. Namely, it can be estimated that WORK-Path3 was executed once for the call of WORK in LOOP1 because $X=0$, $Y=0$, and $Z=1$. Thus, it can be determined that WORK-Path3 was executed for the call of WORK in BLOCK2.

Figure 13:
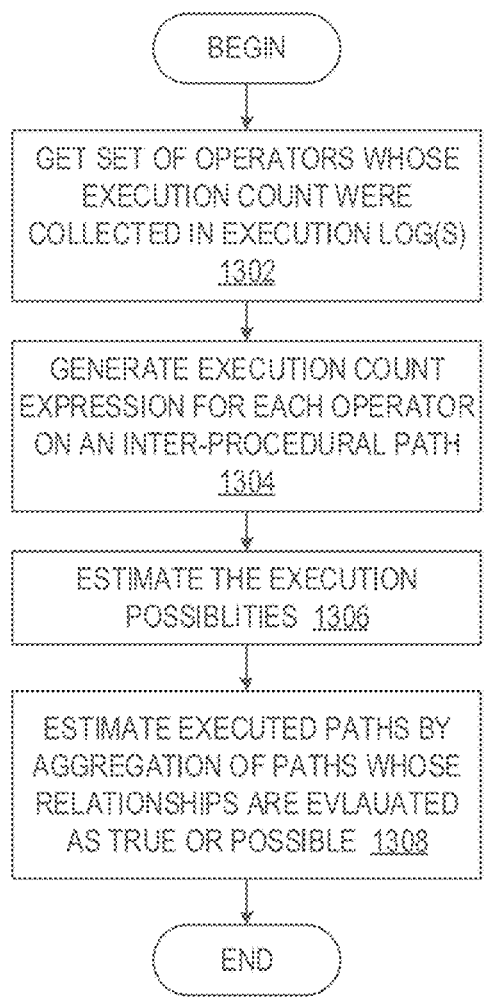
FIG. 13 is a flowchart of an example operation for estimating executed paths in computer application logic in accordance with one illustrative embodiment.
Figure 15:
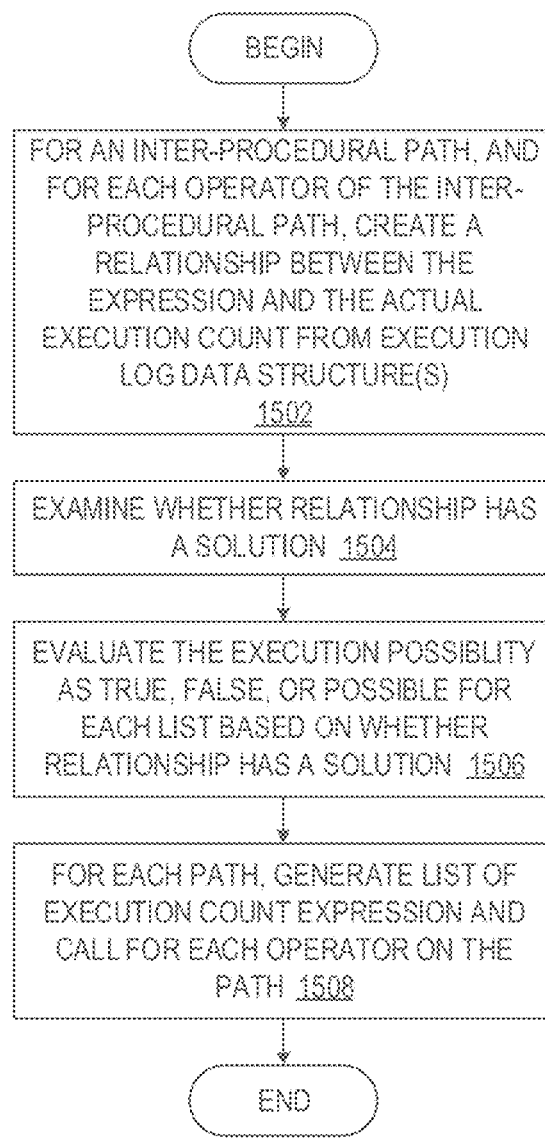
FIG. 15 is a flowchart outlining an example operation for estimating an execution path based on the execution count expressions for the operators in accordance with one illustrative embodiment.
Figure 14:
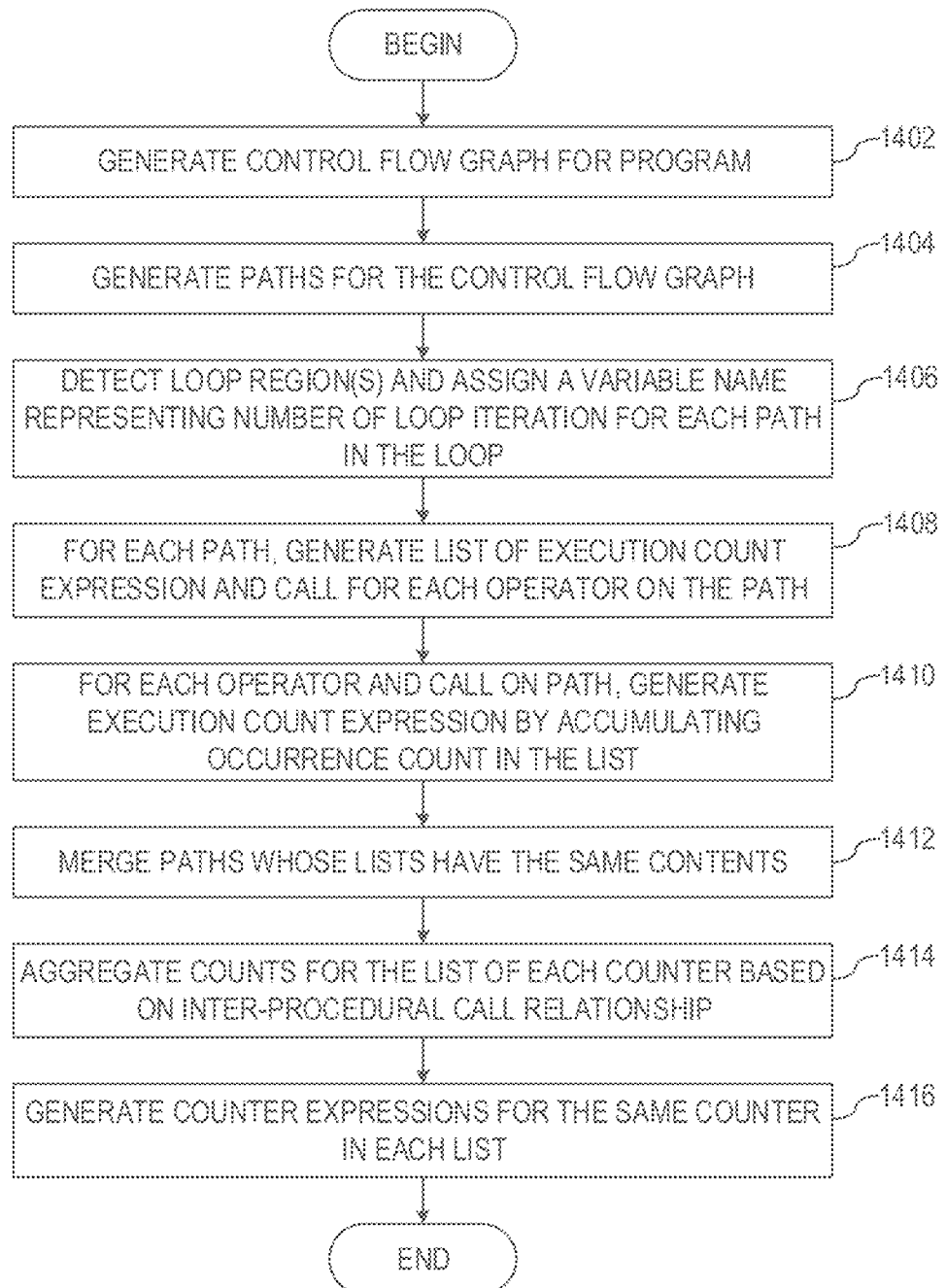
FIG. 14 is a flowchart outlining an example operation for generating an execution count expression for each operator on an inter-procedural path in accordance with one illustrative embodiment.

FIGS. 13-15 present flowcharts outlining example operations of elements of the present invention with regard to one or more illustrative embodiments. It should be appreciated that the operations outlined in FIGS. 13-15 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 13-15, and may, in some cases, make use of the results generated as a consequence of the operations set forth in FIGS. 13-15, the operations in FIGS. 13-15 themselves are specifically performed by the improved computing tool in an automated manner.

FIG. 10 is a flowchart of an example operation for estimating executed paths in computer application logic in accordance with one illustrative embodiment. As shown in FIG. 13, the operation starts by getting the set of operators whose execution counts were collected in the execution log data structure(s) (step 1302). The execution count expression for each operator an inter-procedural path is generated (step 1304) and execution possibilities for each path are estimated (step 1306). The executed paths are estimated by aggregating paths whose relationships are evaluated as true or possible (step 1308). The operation then terminates.

FIG. 14 is a flowchart outlining an example operation for generating an execution count expression for each operator on an inter-procedural path in accordance with one illustrative embodiment. The operation outlined in FIG. 14 may be part of the operation 1304 in FIG. 13, for example. As shown in FIG. 14, the operation starts by generating a control flow graph for a computer application (program) based on the source code (step 1402). The paths through the control flow graph are identified (step 1404) and loop regions are detected and assigned a variable name representing the loop iteration count corresponding to each path in the loop (step 1406). For each path, a list of execution count expressions and calls for each operation on the path is generated (step 1408). For each operator and call on the path, an execution count expression is generated by accumulating the occurrence count in the list of execution count expressions (step 1410). Paths whose lists have the same contents are merged (step 1412). The lists are integrated based on the inter-procedural call relationships in the call graph data structure for the computer application (step 1414). The counter expressions for the same counter in each list are then aggregated to generate the inter-procedural count expressions (step 1416). The operation then terminates.

FIG. 15 is a flowchart outlining an example operation for estimating an execution path based on the execution count expressions for the operators in accordance with one illustrative embodiment. The operation outlined in FIG. 15 may be part of the operation 1306 in FIG. 13, for example. As shown in FIG. 15, the operation starts by creating, for each inter-procedural path and for each operator of the inter-procedural path, a relationship between the operator expression and the actual execution count information from the execution log data structure(s) (step 1502). The relationship is evaluated by a solver to determine whether a solution exists for the relationship (step 1504). The execution possibility for the relationship is evaluated as true, false, or possible, for each list of operators, based on whether the relationship has a solution (step 1506). Then, for each path, a list of execution count expressions and inter-procedural calls are generated (step 1508). The operation then terminates.

Thus, the illustrative embodiments provide an improved computing tool and improved computing tool functionality for estimating execution paths through computer application logic without having to introduce additional overhead of instrumentation or profiling code using performance costly runtime applications.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for identifying execution paths in computer application logic, the method comprising:
generating a control flow graph data structure for the computer application logic based on computer application source code and an execution log data structure corresponding to the computer application logic;
identifying a first set of paths of the control flow graph data structure, wherein the first set of paths comprise paths having operators that match operators for which execution count information is present in the execution log data structure;
generating an operator list for each path in the first set of paths specifying operators present in the path;
generating an operator count expression for each operator in the operator list for each path in the first set of paths;
generating, for each path, a relationship between an operator count expression for the path and actual execution count information for operators in the operator list for the path;
estimating an execution possibility value for each path based on the relationships for each path; and
outputting a second set of paths corresponding to one or more paths whose corresponding execution possibility values indicate the one or more paths are possible execution paths of the computer application logic.

2. The method of claim 1, wherein, for each operator in the operator list, instances of the operator in a loop of a path in the first set of paths are represented in the operator count expression as a function of a number of iterations of the loop.

3. The method of claim 1, wherein estimating the execution possibility value comprises identifying paths whose relationship between the operator count expression and the actual execution count information indicates these values to be equal.

4. The method of claim 1, wherein generating the operator count expression for an operator in the operator list for each path in the first set of paths comprises determining a number of instances of the operator in the path that are outside of any loops in the path, and for each loop in the path, a value that is a function of a number of iterations associated with that loop.

5. The method of claim 1, wherein generating an operator list for each path in the first set of paths specifying operators present in the path further comprises integrating a plurality of operator lists associated with paths of different computer application logic based on inter-procedural calls between the different computer application logic.

6. The method of claim 1, wherein generating an operator count expression for each operator in the operator list for each path in the first set of paths further comprises aggregating operator count expressions for a same operator across operator lists of the paths in the first set of paths.

7. The method of claim 1, wherein estimating the execution possibility value for each path based on the relationships for each path comprises executing a solver on each relationship of each path in the first set of paths to determine whether a solution can be generated for the relationship.

8. The method of claim 7, wherein the solver outputs a value indicative of whether the relationship is true or false for each relationship of each path in the first set of paths, and wherein estimating an execution possibility value for each path based on the relationships for each path further comprises estimating the execution possibility value to be true if each relationship associated with the path is determined by the solver to be true, and estimating the execution possibility value to be false if one or more relationships in the path are determined by the solver to be false.

9. The method of claim 7, wherein the solver outputs a value indicative of whether the relationship is true, possible, or false for each relationship of each path in the first set of paths, and wherein estimating an execution possibility value for each path based on the relationships for each path further comprises estimating the execution possibility value to be true if each relationship associated with the path is determined by the solver to be true, estimating the execution possibility value to be false if one or more relationships in the path are determined by the solver to be false, and estimating the execution possibility value to be possible if one or more relationships in the path are determined by the solver to be possible.

10. The method of claim 1, further comprising:
modifying portions of the computer application logic corresponding to one or more of the paths in the second set of paths to implement an application programming interface or microservice that performs a functionality corresponding to the one or more paths in the second set of paths.

11. A computer program product comprising a computer readable storage medium having a computer readable program stored therein, wherein the computer readable program, when executed on a computing device, causes the computing device to:
generate a control flow graph data structure for the computer application logic based on computer application source code and an execution log data structure corresponding to the computer application logic;
identify a first set of paths of the control flow graph data structure, wherein the first set of paths comprise paths having operators that match operators for which execution count information is present in the execution log data structure;
generating an operator list for each path in the first set of paths specifying operators present in the path;
generate an operator count expression for each operator in the operator list for each path in the first set of paths;
generate, for each path, a relationship between an operator count expression for the path and actual execution count information for operators in the operator list for the path;
estimate an execution possibility value for each path based on the relationships for each path; and
output a second set of paths corresponding to one or more paths whose corresponding execution possibility values indicate the one or more paths are possible execution paths of the computer application logic.

12. The computer program product of claim 11, wherein, for each operator in the operator list, instances of the operator in a loop of a path in the first set of paths are represented in the operator count expression as a function of a number of iterations of the loop.

13. The computer program product of claim 11, wherein estimating the execution possibility value comprises identifying paths whose relationship between the operator count expression and the actual execution count information indicates these values to be equal.

14. The computer program product of claim 11, wherein generating the operator count expression for an operator in the operator list for each path in the first set of paths comprises determining a number of instances of the operator in the path that are outside of any loops in the path, and for each loop in the path, a value that is a function of a number of iterations associated with that loop.

15. The computer program product of claim 11, wherein generating an operator list for each path in the first set of paths specifying operators present in the path further comprises integrating a plurality of operator lists associated with paths of different computer application logic based on inter-procedural calls between the different computer application logic.

16. The computer program product of claim 11, wherein generating an operator count expression for each operator in the operator list for each path in the first set of paths further comprises aggregating operator count expressions for a same operator across operator lists of the paths in the first set of paths.

17. The computer program product of claim 11, wherein estimating the execution possibility value for each path based on the relationships for each path comprises executing a solver on each relationship of each path in the first set of paths to determine whether a solution can be generated for the relationship.

18. The computer program product of claim 17, wherein the solver outputs a value indicative of whether the relationship is true or false for each relationship of each path in the first set of paths, and wherein estimating an execution possibility value for each path based on the relationships for each path further comprises estimating the execution possibility value to be true if each relationship associated with the path is determined by the solver to be true, and estimating the execution possibility value to be false if one or more relationships in the path are determined by the solver to be false.

19. The computer program product of claim 17, wherein the solver outputs a value indicative of whether the relationship is true, possible, or false for each relationship of each path in the first set of paths, and wherein estimating an execution possibility value for each path based on the relationships for each path further comprises estimating the execution possibility value to be true if each relationship associated with the path is determined by the solver to be true, estimating the execution possibility value to be false if one or more relationships in the path are determined by the solver to be false, and estimating the execution possibility value to be possible if one or more relationships in the path are determined by the solver to be possible.

20. An apparatus comprising:
at least one processor; and
at least one memory coupled to the at least one processor, wherein the at least one memory comprises instructions which, when executed by the at least one processor, cause the at least one processor to:
generate a control flow graph data structure for the computer application logic based on computer application source code and an execution log data structure corresponding to the computer application logic;
identify a first set of paths of the control flow graph data structure, wherein the first set of paths comprise paths having operators that match operators for which execution count information is present in the execution log data structure;
generating an operator list for each path in the first set of paths specifying operators present in the path;
generate an operator count expression for each operator in the operator list for each path in the first set of paths;
generate, for each path, a relationship between an operator count expression for the path and actual execution count information for operators in the operator list for the path;
estimate an execution possibility value for each path based on the relationships for each path; and
output a second set of paths corresponding to one or more paths whose corresponding execution possibility values indicate the one or more paths are possible execution paths of the computer application logic.

\* \* \* \* \*